United States Patent [19]

Chase

[11] Patent Number: 5,859,930
[45] Date of Patent: Jan. 12, 1999

[54] FAST PATTERN RECOGNIZER UTILIZING DISPERSIVE DELAY LINE

[75] Inventor: Walter E. Chase, Nashua, N.H.

[73] Assignee: FPR Corporation, Merrimack, N.H.

[21] Appl. No.: 567,892

[22] Filed: Dec. 6, 1995

[51] Int. Cl.[6] .................................................. G06K 9/64
[52] U.S. Cl. ..................... 382/218; 382/278; 382/280; 382/115; 364/820; 333/150
[58] Field of Search .................... 382/181, 115, 382/209, 217, 218, 280, 199, 219, 220, 210, 278; 364/819, 821; 333/150

[56] References Cited

U.S. PATENT DOCUMENTS

| | | | |
|---|---|---|---|
| 3,836,876 | 9/1974 | Marshall et al. | 333/111 |
| 3,851,951 | 12/1974 | Eveleth | 359/286 |
| 3,883,831 | 5/1975 | Williamson et al. | 333/153 |
| 4,096,740 | 6/1978 | Sallee | 73/778 |
| 4,477,784 | 10/1984 | Maerfeld et al. | 333/153 |
| 4,532,603 | 7/1985 | Gerard | 364/819 |
| 4,581,762 | 4/1986 | Lapidus et al. | 382/263 |
| 4,647,099 | 3/1987 | Apostolos | 294/103.1 |
| 4,843,631 | 6/1989 | Steinpichler et al. | 382/280 |
| 5,079,735 | 1/1992 | Apostolos | 364/827 |
| 5,161,204 | 11/1992 | Hutcheson et al. | 382/157 |
| 5,179,309 | 1/1993 | Stokes et al. | 310/313 B |
| 5,191,621 | 3/1993 | Brok | 382/100 |
| 5,274,716 | 12/1993 | Mitsuoka et al. | 382/210 |
| 5,327,286 | 7/1994 | Sampsell et al. | 359/561 |

OTHER PUBLICATIONS

Peter Seitz and Martin Bichsel, "The Digital doorkeeper" –Automatic face recogintion with the computer, Proceedings 25th Annual 1991 IEEE International Carnahan Conference on Security Technology, Oct. 1–3, 1991, pp. 77–83.

F. You, Y.Q. Shi and P. Engler, "Fingerprint Pattern Recognition For Medical Uses –A Frequency Domain Approach", Proceedings of the 1993 IEEE Nineteenth Annual Northeast Bioengineering Conference, Mar. 18–19, 1993, pp. 176–177.

R.S. Withers, A.C. Anderson, P.V. Wright and S.A. Reible, "Superconductive Tapped Delay Lines For Microwave Signal Processing", IEEE Transactions On Magnetics, vol. MAG 19, No. 3 May 1983.

K. Raghunath Rao and Jezekiel Ben–Arie, "Nonorthogonal Image Expansion Related to Optimal Template Matching in Complex Images", Graphical Models and Image Processing vol. 56, No. 2, Mar. 1994, pp. 149–160.

Minemoto, T. et al., "Hybrid Pattern Recognition by Features Extracted from Object Patterns and Fraunhofer Diffraction Patterns", *Applied Optics* 24:2914–2920 (1985), Sep. 15.

Biaggio, I. et al., "Optical Image Processing by an Atomic Vapour", *Nature 371*:318–230 (1994), Sep. 22.

Mersereau, R.M. et al., "Two–Dimensional Digital Filtering",*IEEE Proc.* 63(4):610–623 (1975).

*Primary Examiner*—Jon Chang
*Attorney, Agent, or Firm*—Cesari & McKenna, LLP

[57] ABSTRACT

A fast pattern recognition system includes a combination of digital and analog processing circuitry which allows the system to achieve super computing processing speeds within an open personal computer architecture. The system receives a bit map which is representative of the unknown pattern, such as a picture of an unknown person. The bit map could have multiple people in it—no other system has "faces in the crowd" ability. The bit map associated with the unknown pattern is then pre-processed and compared against a plurality of known patterns in a database using a dispersive delay line, to determine how well the unknown pattern correlates with the known patterns.

43 Claims, 26 Drawing Sheets

FAST PATTERN RECOGNIZER UTILIZING DISPERSIVE DELAY LINE

TECHNICAL FIELD

The current invention relates to pattern recognition, and more particularly to a robust fast pattern recognizer.

BACKGROUND OF THE INVENTION

Pattern recognition is fundamental to every endeavor in which humans are involved. Decisions are constantly being made based upon the appearance of a pattern, and its comparison to a known references. Typical areas where pattern recognition has been employed include: speech recognition, automated inspection systems and character recognition.

With the advent of the digital computer and the associated advances in microelectronics, storing, accessing and processing large amounts of data became much easier, and hence the use of automated pattern recognition systems has grown. However, the power of these systems has not been fully realized due to the problems with their architecture and associated processing techniques. In particular, a problem which has plagued these systems is their limited operational speed, i.e., these systems are limited in the number of comparisons they can perform per second.

Consider, for example, a digital based pattern recognition system such as that disclosed in U.S. Pat. No. 5,161,204, entitled *Apparatus for Generating a Feature Matrix Based on Normalized Out-Class and In-Class Variation Matrices*. In this system a feature vector is formed from a digitized unknown pattern, and the feature vector is processed digitally in a neural network to identify the unknown pattern. A problem with this approach is the time that it takes to identify the unknown pattern, primarily due to the processing demands associated with performing a Fourier transformation in a digital system. Special purpose integrated circuits can be used to perform the Fourier transform digitally, but these are expensive and still relatively slow. In addition, neural network pattern recognition systems can not perform "faces in the crowd" identification.

Pattern recognition systems have also employed optical correlators to compare the known and unknown patterns. However, the problems with optical correlators include their complexity, their inflexibility to system changes (i.e., optical components can not easily be changed since the lenses would have to be reground) and their reduced accuracy in comparison to digital systems (assuming of course that the quantization error in the digital system is quite small). In addition, although the actual correlation is very fast once the known and unknown images are presented to the correlator, the speed of the system is constrained by how quickly images of the known and unknown pattern can be exhibited as real images (e.g., on an photographic plate or LCD). The following references disclose pattern recognition systems which utilize optical correlators and are representative of systems plagued by the problems discussed above: 1) "Hybrid Pattern Recognition by Features Extracted from Object Patterns and Fraunhofer Diffraction Pattern" by Takumi Minemoto and Junzo Narano, published in Applied Optics, Vol. 24, No. 18, pg. 2914–2920, Sep. 15, 1995; 2) "Optical Image Processing by an Atomic Vapor", by Ivan Biaggo et al., Nature, Vol. 371, pg. 318–320, Sep. 22, 1994; and 3) U.S. Pat. No. 5,274,716 entitled "Optical Pattern Recognition Apparatus", by Yasuyuki Mitsuoka et al.

Therefore, there is a need in the field of pattern recognition for a fast pattern recognizer to overcome the problems set forth above.

SUMMARY OF THE INVENTION

An object of the present invention is to provide a fast pattern recognition system for identifying an unknown pattern.

Another object is to provide a pattern recognition system which is capable of identifying multiple objects/patterns in a field of view at various orientations, sizes and aspect angles.

A further object is to provide a pattern recognition system capable of identifying an unknown individual.

Yet another object is to identify an unknown individual under various lighting conditions, facial expressions, facial orientations, and facial changes due to aging.

Briefly, in a pattern recognition system for identifying an unknown pattern, the unknown pattern in the spatial domain is partitioned into sub-patterns and converted to the spatial-frequency domain. Each resultant transformed unknown sub-pattern is then complex multiplied with a known pattern, which is also in the spatial-frequency domain. Each product is then modulated in the continuous spatial-frequency domain with a local oscillator signal $f_m$ to bandshift the signal, and the bandshifted signal is applied to a dispersive delay line which is tuned to a predetermined matched chirp signal $f_{ch}$. The dispersive delay line provides a signal indicative of the level of correlation (i.e., the quality of the match) between the known and unknown pattern.

In order to identify the unknown pattern, the pattern is compared against a plurality of known patterns to determine the known pattern that most closely correlates within the unknown pattern.

To establish a data base of known patterns, images of known objects are gathered and processed to provide, in the spatial-frequency domain, a pattern (i.e., a template) which is uniquely indicative of the known object. The complex conjugate of the pattern is then taken, and multiplied by the chirp signal $f_{ch}$ which is matched to the dispersive delay line. The resultant signal is then hard limited to provide a known pattern which is then used in comparisons against unknown patterns.

When the known and unknown patterns match/correlate, phase variations associated with the patterns will essentially be canceled by the complex multiplication. Thus, the spatial-frequency spectrum of the resultant signal will include, primarily, the matched chirp signal $f_{ch}$. When this signal is applied to the dispersive delay line, the output is a bounded impulse signal that indicates that a match has been detected, and thus, identifies the unknown pattern. The time at which the impulse is output from the dispersive delay line indicates the position of the object in the pattern.

More specifically, upon receiving an unknown pattern (e.g., a picture of an unknown individual), the present invention digitizes the unknown pattern and processes the digitized unknown pattern to compute a two-dimensional matrix of data indicative of a gradient of observable features in the pattern.

In one embodiment, this two-dimensional matrix of gradient information is converted to a one-dimensional array. The array is then sub-divided into a plurality of sub-arrays (e.g., fifteen) each associated with a certain spatial region of the unknown pattern, and each sub-array is transformed from the spatial domain to the spatial-frequency domain. The unknown pattern sub-arrays are "stitched" together and then sequentially compared against the known pattern to determine if the image represented by the known pattern appears in the spatial region associated with the sub-array.

To compare a known pattern to an unknown pattern sub-array sequence, the known pattern and the unknown pattern sub-array sequence are complex multiplied and the resultant product is converted to an analog signal (i.e., the continuous spatial-frequency domain). The analog signal is then modulated to bandshift the signal to the center frequency of the dispersive delay line, and the bandshifted signal is applied to the delay line. The template for the known patterns, as stored in the database, represents a matched filter when the known and unknown patterns correlate.

The present invention may also use a two-dimensional dispersive delay line. In this embodiment the known patterns are each stored as a two-dimensional matrix in the spatial-frequency domain. The unknown pattern, also in the form of a two-dimensional matrix, is sub-divided into a plurality of sub-matrices and transformed to the spatial-frequency domain using a two-dimensional FFT. Each of the transformed unknown pattern sub-matrices are then compared to the known pattern matrix by preferably, simultaneously, comparing each row (or column) of the known pattern matrix against an associated row (or column) in the unknown pattern sub-matrix. This is achieved by complex multiplying associated rows, converting the resultant product to an analog signal, bandshifting the analog signal associated with the row, and inputting the bandshifted signal to an associated one of a plurality of input transducers on the two-dimensional dispersive delay line.

An advantage of the present invention is that by its sub-division of the processing between digital and analog circuitry, the present invention realizes processing speed heretofore only available in supercomputers for quickly identifying unknown patterns. In addition, the system of the present invention is compatible with open architecture systems, and therefore is easily implemented and relatively inexpensive.

The system of the present invention may be used to recognize faces, continuous speech keywords, zip codes, finger prints (even partials fingerprints), and various other unknown patterns and signals.

The present invention has proven to be so effective at identifying faces that an identification of an unknown person can be made using only an image of the unknown individual's eyes, or of a partially obscure face. In addition, the system of the present invention is translation independent. That is, the object of interest can be anywhere in the unknown pattern and still be identified.

These and other objects, features, and advantages of the present invention will become more apparent in light of the following detailed description of a preferred embodiment thereof as illustrated in the accompanying drawings.

DETAILED DESCRIPTION OF THE INVENTION

Figure 1:
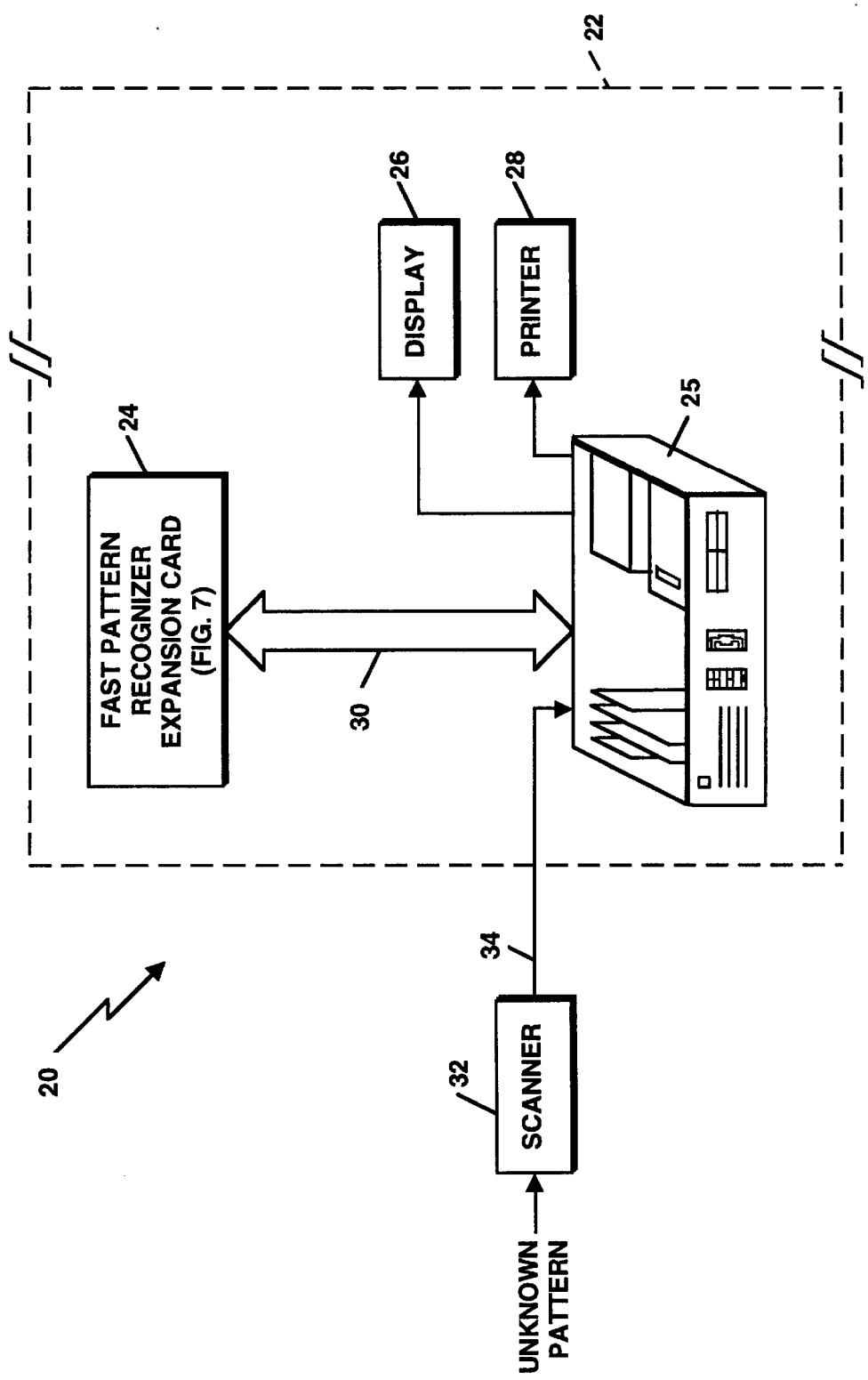
FIG. 1 is an illustration of a functional block diagram of the fast pattern recognizer of the present invention.

FIG. 1 illustrates a functional block diagram of a pattern recognition system 20. The system 20 includes a computer system 22 (e.g., an IBM™ compatible personal computer system) and a custom hardware card 24 which can be placed into an expansion slot of the personal computer system 22. The computer system 22 includes a CPU 25 (e.g., Pentium™, PowerPc™ or Alpha™) that executes an application program associated with the present invention. The application program, which is stored in the computer's non-volatile memory (not shown), will be discussed in detail hereinafter with reference to FIGS. 2 and 3. The computer 22 also includes peripheral devices such as a display 26 and a printer 28.

The pattern recognition system 20 receives an unknown pattern (e.g., a picture) which is applied to a scanner 32 which digitizes the unknown pattern and applies the digitized pattern to the computer 22 over a data line 34. The computer 22 pre-processes the digitized pattern and transmits the processed unknown pattern to the expansion card 24 via an expansion card bus 30. The computer 22 also transmits data indicative of a known pattern, which is stored in a database, to the card 24 via the expansion card bus 30. How the known pattern is created shall be discussed in detail hereinafter with reference to FIG. 2.

The card 24 performs a comparison of the known and unknown patterns to determine a level of correlation between them. The CPU 25 then receives a signal value from the card 24 indicative of the level of correlation, and as discussed below, the location of the known pattern in the unknown pattern.

The custom hardware card 24 is preferably an expansion card which is compatible with the known Industrial Standard Architecture (ISA).

By way of illustration, the present invention will be discussed in the context of a pattern recognizer for identifying faces. However, it is contemplated that the present invention can be used in many different pattern recognition systems including, for example, human biometrics such as facial images, finger prints, voice prints, thermograms, X-rays, and sonograms. The present invention may also compare geometric patterns, such as manufactured items (i.e., machine vision inspection systems) and printed items (e.g., photos, alpha-numerics, foreign languages). It is contemplated that the fast pattern recognition system of the present invention may be used in financial institutions, airports, police stations, and points of international entry and debarkation.

Figure 2:
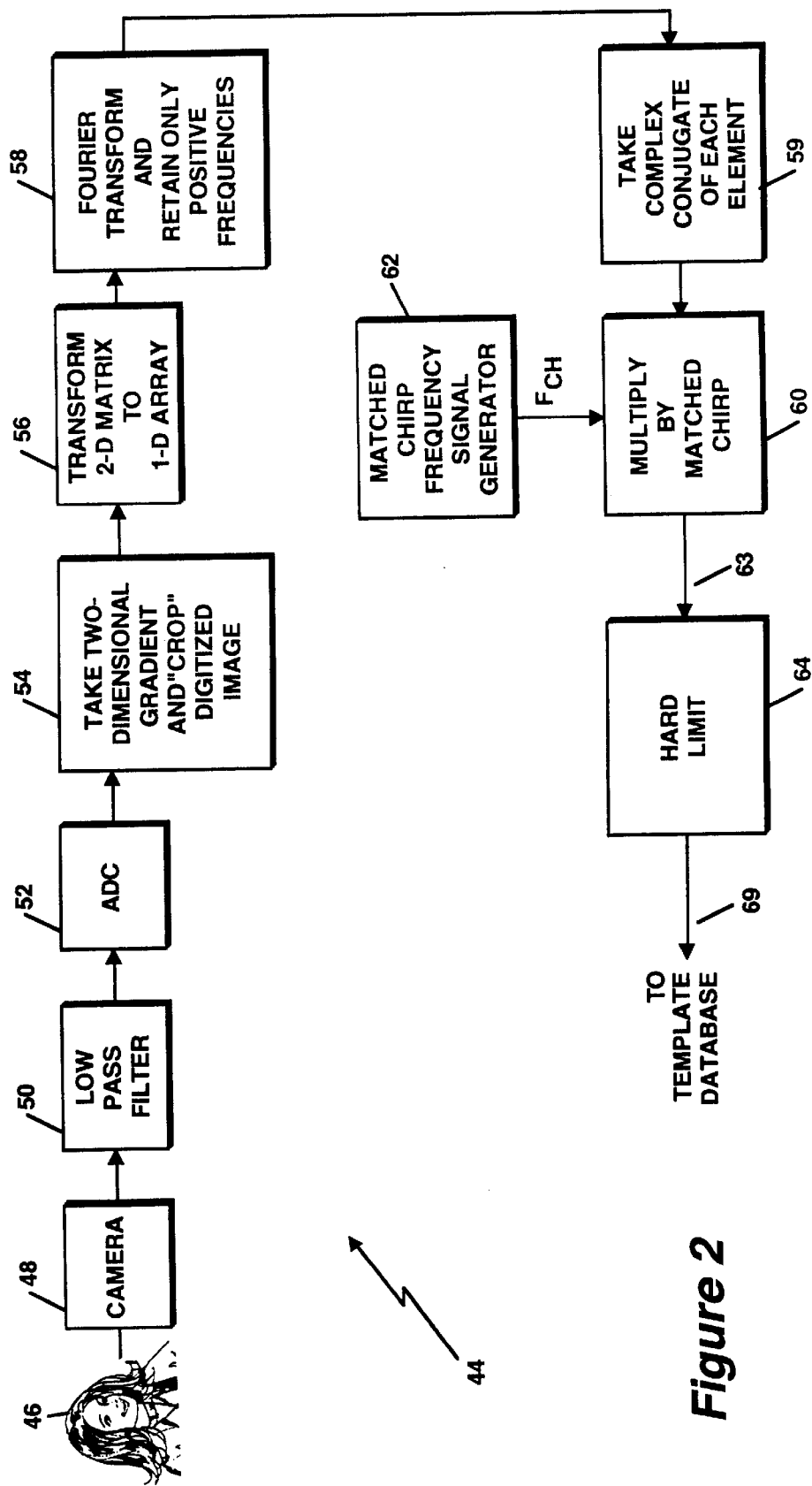
FIG. 2 is an illustration of a functional block diagram of the processing steps performed to create templates of known patterns.

Before any comparison between the unknown and known patterns can be performed, a database of known pattern templates must be created. FIG. 2 depicts in block diagram form the processing steps for creating templates of known patterns which are stored in the CPU 25 (FIG. 1). The first step in creating a template is to take a picture of a known individual 46 using a camera 48 (e.g., a video camera, still camera, etc.). The camera provides an image to an anti-aliasing low pass filter 50 which then provides a filtered image to an analog-to-digital converter (ADC) 52. The ADC 52 provides a two-dimensional matrix of digitized bit map gray scale image information (i.e., discrete spatial domain image information) indicative of the known individual 46. If the camera provides the data in the discrete spatial domain then the ADC processing is not required since the data is already digitized.

The subsequent processing of the present invention may use either a two-dimensional matrix of information, or it may transfer the information in the matrix into a one-dimensional array. In the interest of clarity, the present invention shall first be discussed in the context of a system which utilizes one-dimensional array processing. The invention will then be discussed in the context of a system which employs two-dimensional matrix processing.

One Dimensional Processing

Referring again to FIG. 2, the next step 54 involves taking a two-dimensional gradient of the bit-mapped gray scale data in the matrix and "cropping" the image to discard the pixels in the image not associated with the known person's face, thus reducing the amount of information retained about the image. The resultant two-dimensional matrix of "cropped" gradient data is applied to transformation 56, which transforms the data into a one-dimensional array. The techniques for converting data in a two-dimensional matrix into a one-dimensional array is generally well known. One such technique is disclosed in a paper entitled *"Two-Dimensional Digital Filtering"* by Russell M. Mersereau and Dan E. Dudgeon, IEEE Proc. 63(4); 610–623 (1975).

Following the conversion, the one-dimensional array is then applied to a Fourier transformation 58 (e.g., an FFT) which provides a one-dimensional array of spatial-frequency domain information. Step 59 then takes the complex conjugate of each element in the array and the resultant array of complex conjugates is applied to a multiplier 60, wherein the information is multiplied by a matched chirp signal $f_{ch}$, which is generated by a frequency signal generator 62. As known, a chirp signal is a waveform having a carrier frequency signal which changes continuously in one direction.

Following the multiplication by the matched chirp signal $f_{ch}$, the resultant product on a line 63 is applied to a hard limit function 64. The operation of the hard limit function is best understood through the presentation of an example.

Figures 3A, 3B:
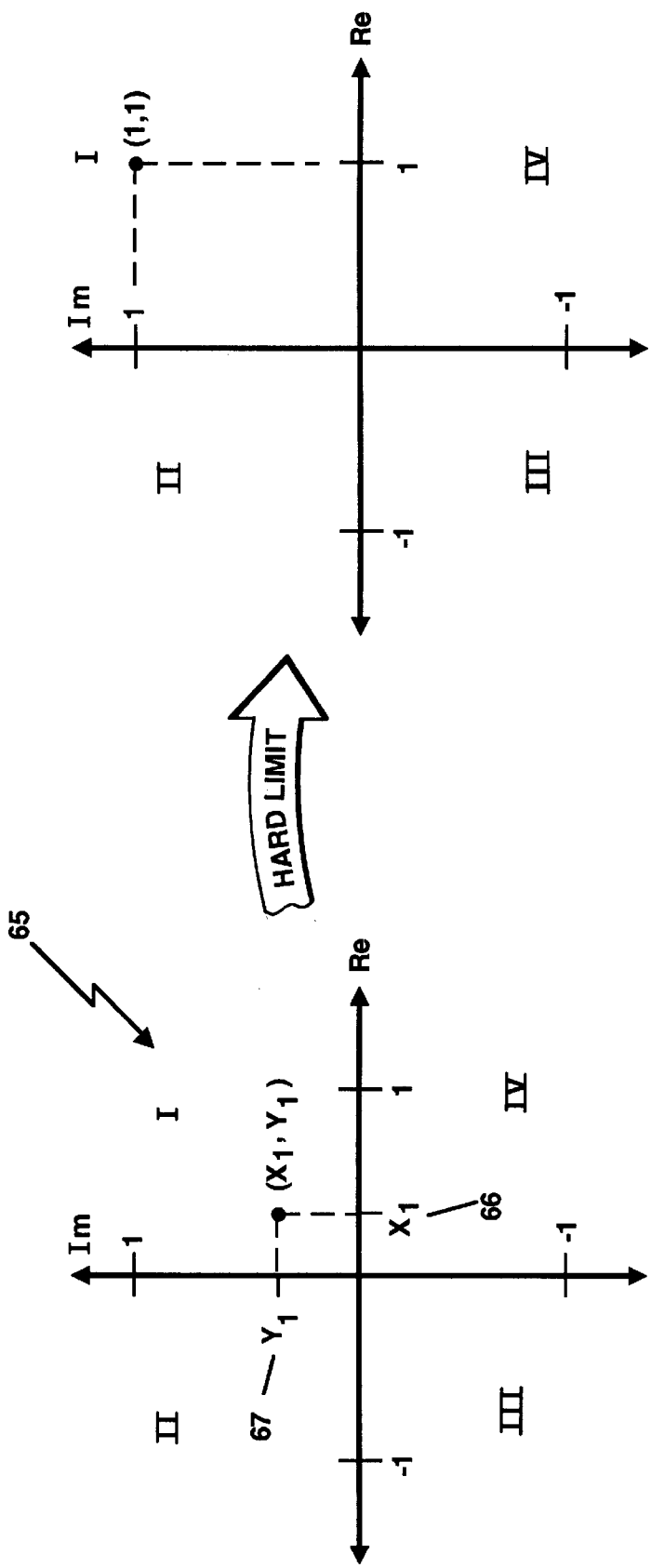
FIGS. 3A and 3B are plots illustrating the mapping of signal values by the hard limit function illustrated in FIG. 2.

FIG. 3A illustrates a Cartesian plot 65 of a complex signal value, wherein the real signal component is plotted along the horizontal axis and the imaginary signal component value is plotted along the vertical axis. For any complex signal value applied to the hard limit function 64, the function maps the value into one of four possible values, depending upon which quadrant the input signal value is in. For example, consider an input signal value having a real signal component $X_1$ 66 and an imaginary signal component $Y_1$ 67. The hard limit function 64 first determines the quadrant in which the input value is located, and provides a predetermined output signal value for all signal values located in that quadrant. For example, all input signal values $(X_i, Y_i)$ located in quadrant I will be mapped to the value (1,1) as shown in FIG. 3B. Similarly, all input signals values $(X_i, Y_i)$ located in quadrant II will be mapped into (–1,1). Input signal values in quadrant III will be mapped to (–1,–1), and values in quadrant IV will be mapped to (1,–1). Thus, the hard limit function 64 (FIG. 2) provides one of four possible output signal values for any given input signal value, depending on the quadrant in which the input signal value is located. This further reduces the size of the template array since less bits are required to present each pixel. For example, in a system which employs sixteen level of gray scale, hard limiting as set forth above reduces the amount of data by a factor of two (i.e., a reduction from four bits to two bits per pixel). The result is a template which is the same size as the sub-array to be discussed herein with reference to FIGS. 4 and 8.

Referring again to FIG. 2, the output of the hard limit function on a line 69 is a known template array of a predetermined size, where each element in the array comprises one of four possible complex signal values, represented by their Cartesian coordinates. The size of the array on the line 69 (i.e., the number of elements in the array) is selected to provide enough information to uniquely identify the known individual 46, while not providing too much information to slow down unnecessarily the subsequent processing. This processing involves comparing the template associated with the known individual with a template associated with an unknown individual. It is contemplated that a sub-array of about one (1) kilobyte or less will provide sufficient information to uniquely identify the known individual 46. A database of known individuals is created by performing the processing steps in FIG. 2 for a number of known individuals, and storing templates of known individuals.

Figure 4:
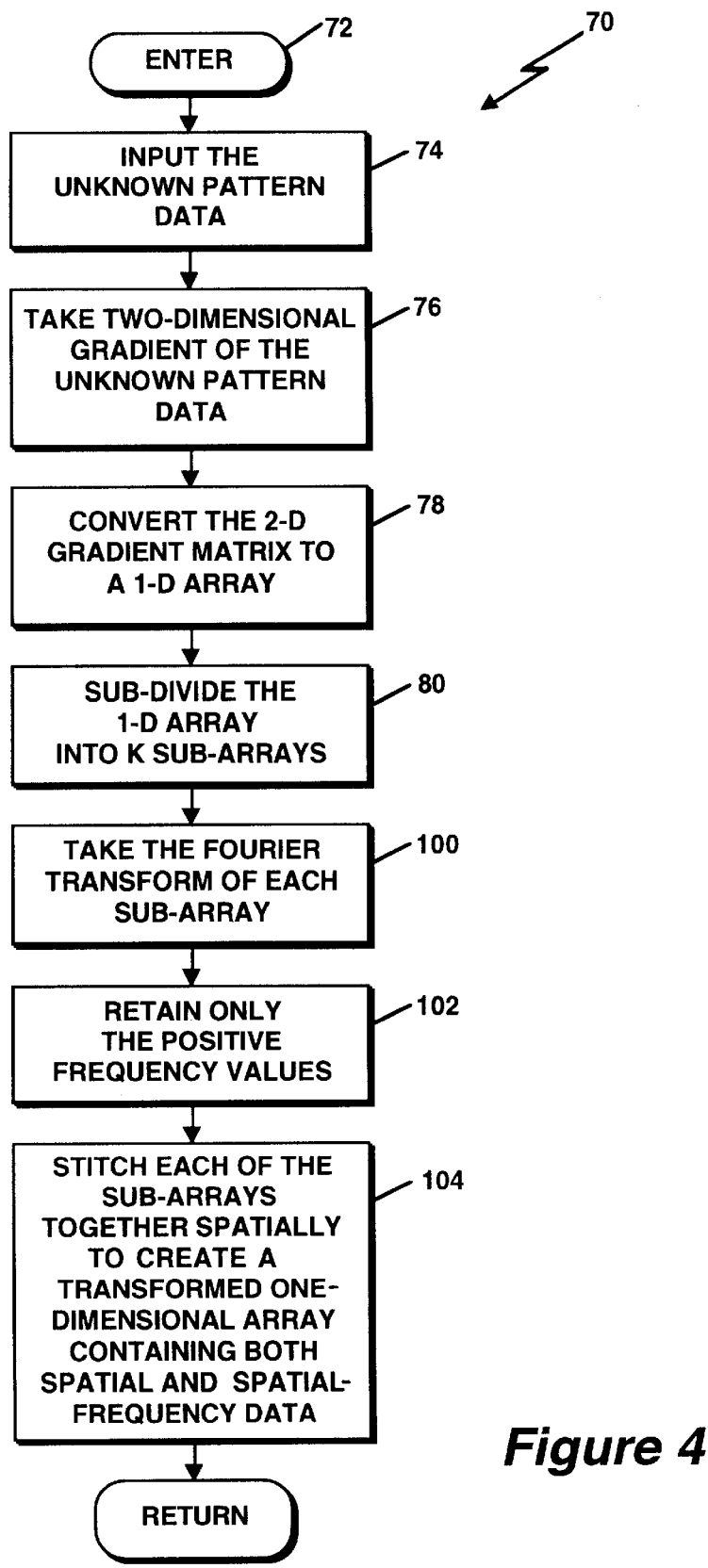
FIG. 4 is a flow chart illustration of the processing steps performed on the unknown pattern in the computer 22.
Figure 5:
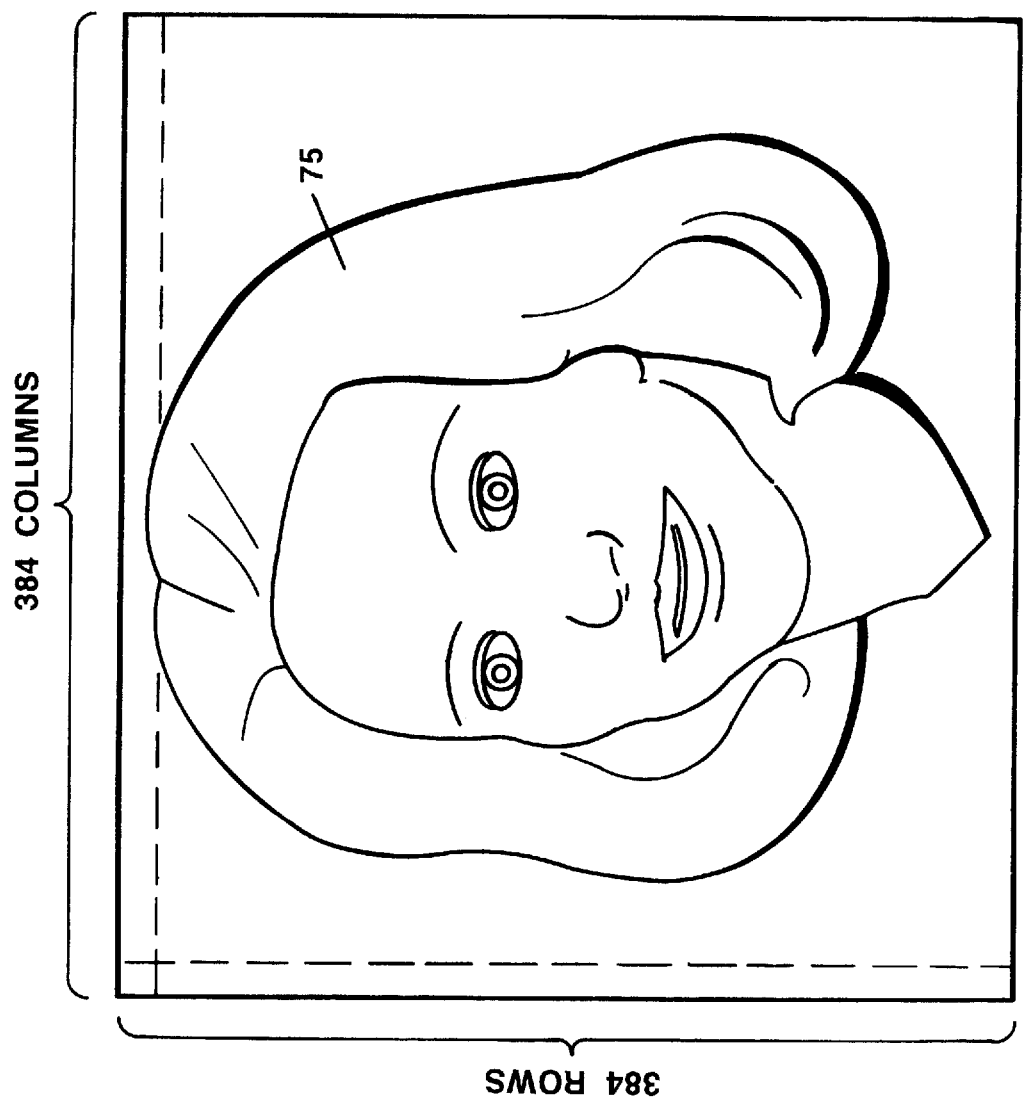
FIG. 5 is a pictorial illustration of a bit mapped matrix of gray scale data representative of a person's image.

FIG. 4 illustrates a flow chart illustration 70 of the processing steps associated with the application program that is executed in the CPU 25 (FIG. 1). The application program produces a template that is associated with the unknown pattern. An image is scanned by scanner 32 (FIG. 1) and is read as a data pattern in step 74. The data pattern is typically in the form of a two-dimensional matrix 75 of bit-mapped gray scale data as shown in FIG. 5. These matrix elements are real valued, as opposed to complex valued.

Referring again to FIG. 4, step 76 is then performed to take the gradient of the information contained in the two-dimensional matrix. The resultant data, also in the form of a two-dimensional matrix, contains gradient information indicative of the rate of change of observable features across the face of the unknown individual 46 (FIG. 2).

This two-dimensional matrix of gradient information is then transformed into a one-dimensional array of M elements of gradient information in step 78. Next, step 80 is performed to sub-divide the one-dimensional array of M elements (e.g., 8192) of gradient information into a plurality of K overlapping sub-arrays. A detailed discussion regarding how a typical one-dimensional array is sub-divided, shall now be presented.

Figure 6:
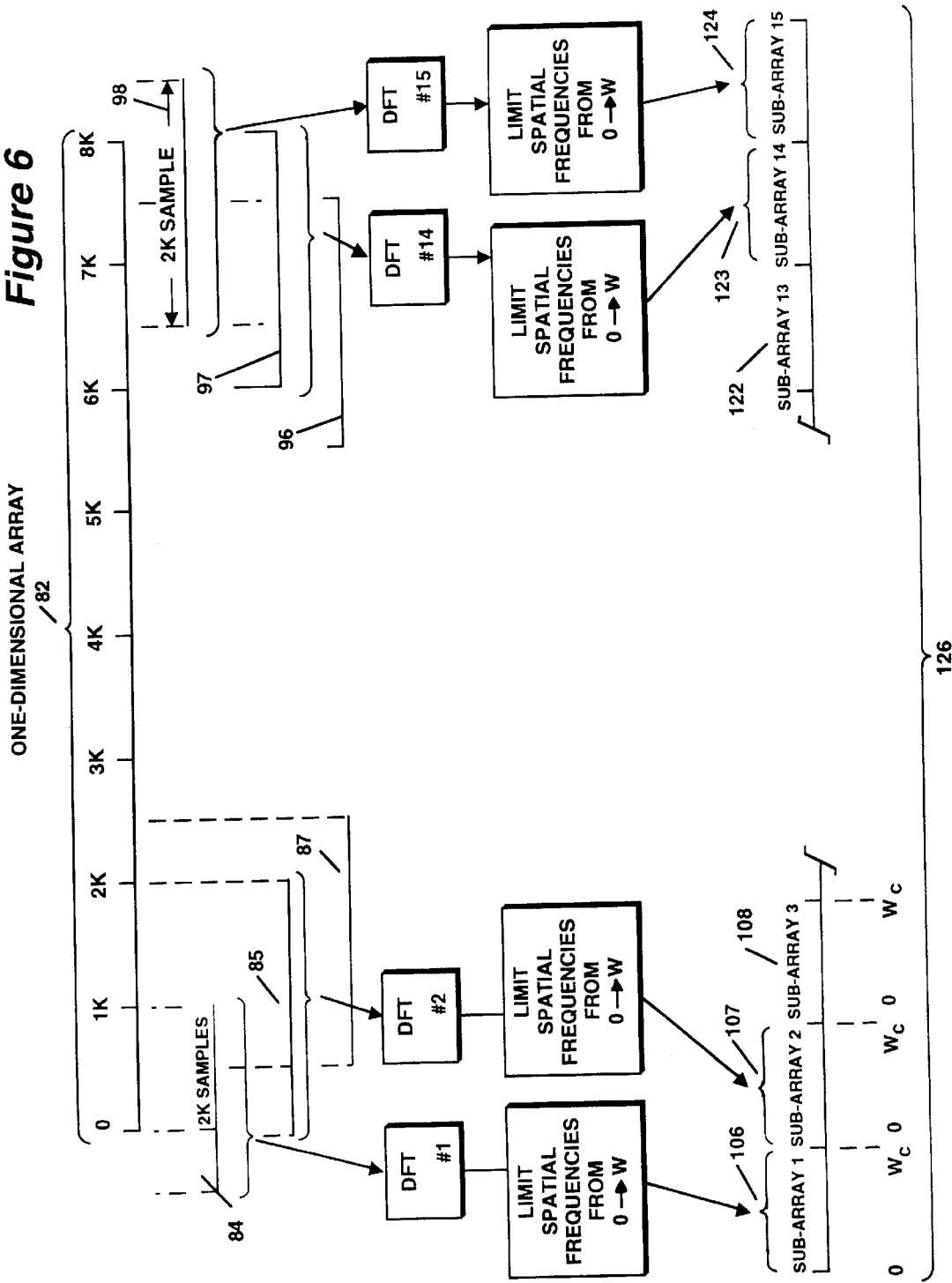
FIG. 6 is a pictorial illustration of a one-dimensional array associated with the unknown pattern, and the partitioning of the array into sub-arrays for subsequent processing.

FIG. 6 depicts a one-dimensional array 82 which is sub-divided into fifteen overlapping sub-arrays 84–98. As shown, each of the overlapping sub-arrays 84–98 are of equal size, and in one embodiment, each contains 2048 elements. Each sub-array is spatially shifted from its adjacent sub-arrays by a predetermined number (or percentage) of elements. In this example, each array is shifted five-hundred twelve (512) elements from its adjacent sub-arrays. Since the first and last overlapping sub-arrays 84,98, respectively, extend beyond the boundaries of the one dimensional array 82, the first two-hundred fifty six (256) data elements of sub-array 84 and the last two-hundred fifty-six (256) data elements of the sub-array 98 are padded with zeros, to complete the 2048 elements in these sub-arrays.

Referring now to both FIGS. 4 and 6, each of the sub-arrays 84–98 are then processed by the CPU 25 (FIG. 1) in step 100 to compute their Fourier transform. The transformed data, now in the spatial-frequency domain, is then filtered in step 96 to retain only the positive spatial-frequency values. This reduces the amount of information of each transformed sub-array by one-half, or 1024 elements. One of ordinary skill will recognize that this reduction can be performed without any loss of information because in the real discrete spatial domain, negative spatial-frequency values (i.e., $-\omega_c$ to 0) contain the same information as the positive spatial-frequency values (i.e., 0 to $\omega_c$). Conversely, one may elect to retain only the negative spatial-frequency values rather than the positive spatial-frequency values. Note, each spatial frequency value is a complex signal value represented by an in-phase (I) signal component and a quadrature (Q) signal component.

Next, step 104 is performed to stitch each transformed sub-array 106–124 together spatially to generate a transformed one-dimensional array 126 as shown in FIG. 6. The resultant one-dimensional array 126 is a hybrid domain representation since each of the fifteen sub-arrays 106–124 includes spatial-frequency domain information, and each of the fifteen sub-arrays is uniquely associated with a different spatial region of the unknown pattern 82. As discussed in more detail with respect to FIG. 10, this allows the system of the present invention to process an unknown pattern that includes in various spatial regions the pictures of several unknown individuals, and separately identify each face in the scene associated with the unknown pattern. This assumes of course, that the data base of known patterns contains templates that are associated with these unknown individuals.

Once the unknown pattern has been preprocessed by the CPU 25 (FIG. 1), the transformed one-dimensional array 126 can be compared against the templates stored in the data base to identify the unknown pattern.

Figure 7A:
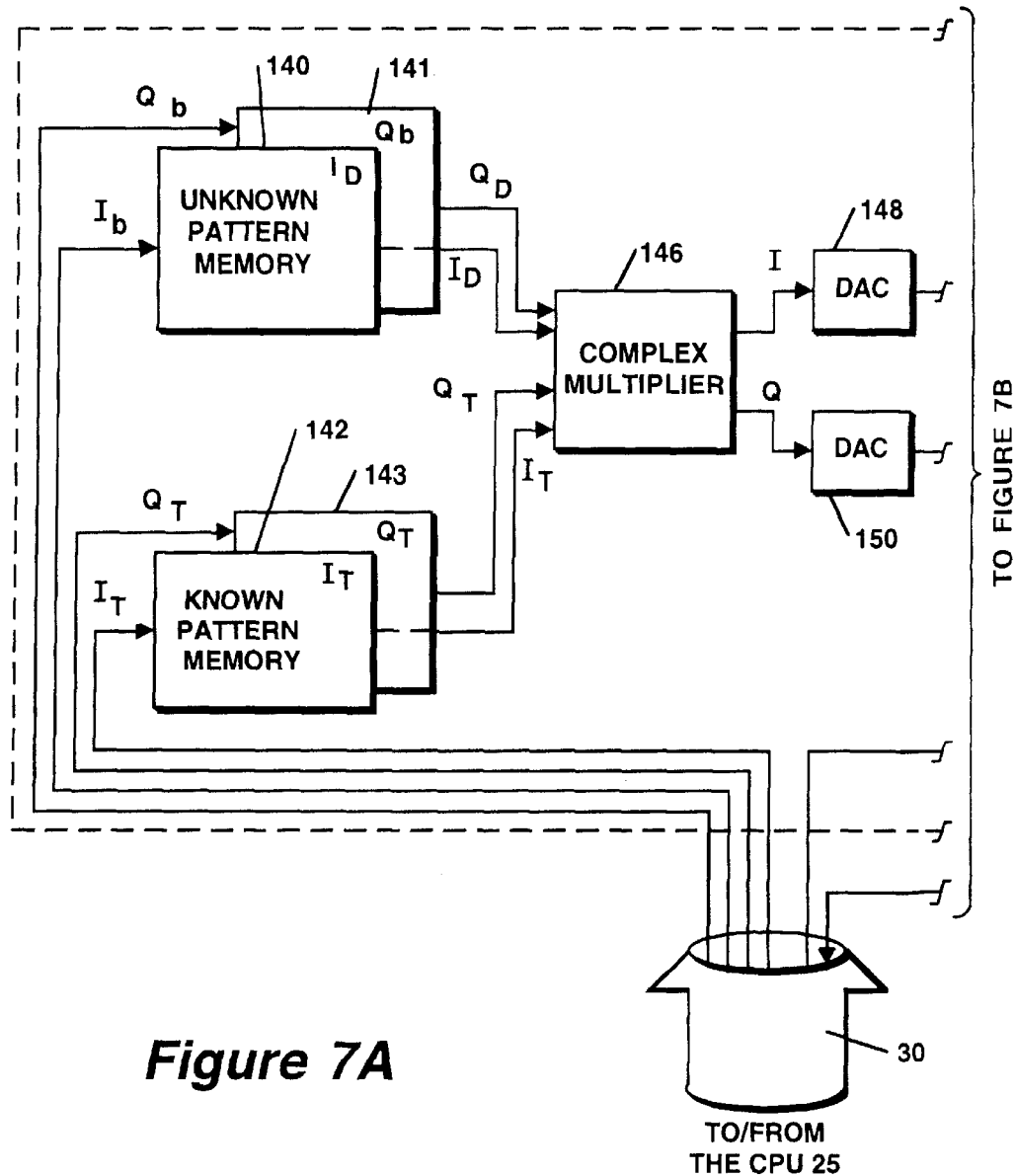
FIG. 7 is a block diagram of the fast pattern recognizer expansion card.
Figure 7B:
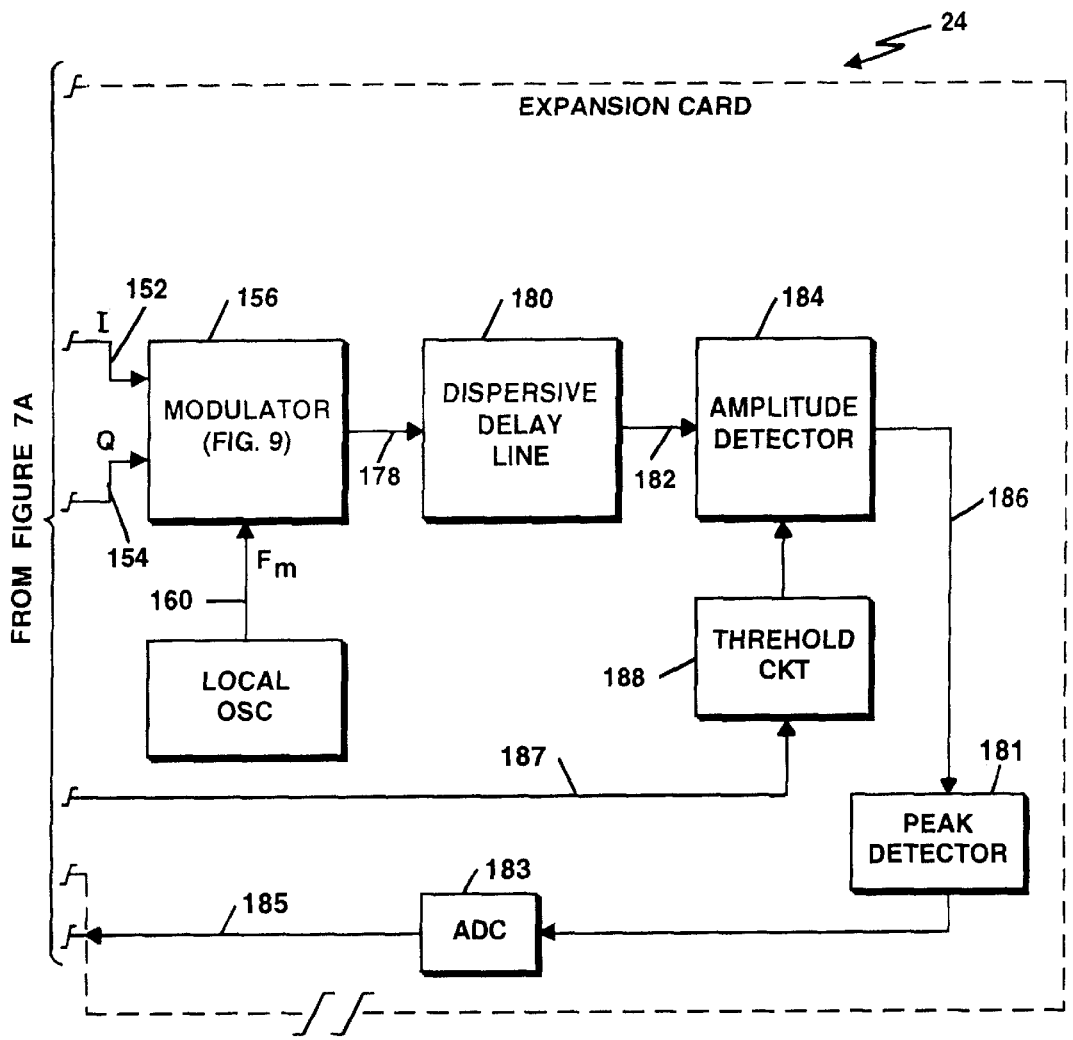

FIG. 7 is a functional block diagram of the fast pattern recognizer expansion card 24. The expansion card 24 receives the transformed one-dimensional array 126 (FIG. 6) representative of the unknown pattern via the expansion card bus 30. Since the information in the transformed one-dimensional array is complex, as represented by its in-phase (I) and quadrature (Q) components, the I and Q components, are stored in unknown pattern memories 140,141 respectively. Similarly, a template associated with a known pattern and containing I and Q components is input from the CPU 25 (FIG. 1) to known pattern memories 142, 143 via the expansion card bus 30. Each of the memories 140–143 is preferably a static RAM (i.e., SRAM) with relatively fast data access time. However, one of ordinary skill will appreciate that various types of electronic memory devices (e.g., DRAM, flash RAM, etc.) may be used, depending upon the particular implementation of the present invention, and the system design requirements of the end user.

To compare the one-dimensional array 126 (FIG. 4) stored in the unknown pattern memories 140,141 with the template associated with the known pattern and stored in the template memories 142,143, a complex multiplier 146 receives the I and Q signals from each memory and performs a complex multiplication. The complex multiplier multiplies each element in the unknown pattern array 126 with its corresponding element in the known pattern array.

For each unknown pattern, a number of comparisons are made against the known pattern to determine if an identification can be made. This processing is best illustrated by referring to a figurative illustration of the comparison process as depicted in FIG. 8.

Figure 8:
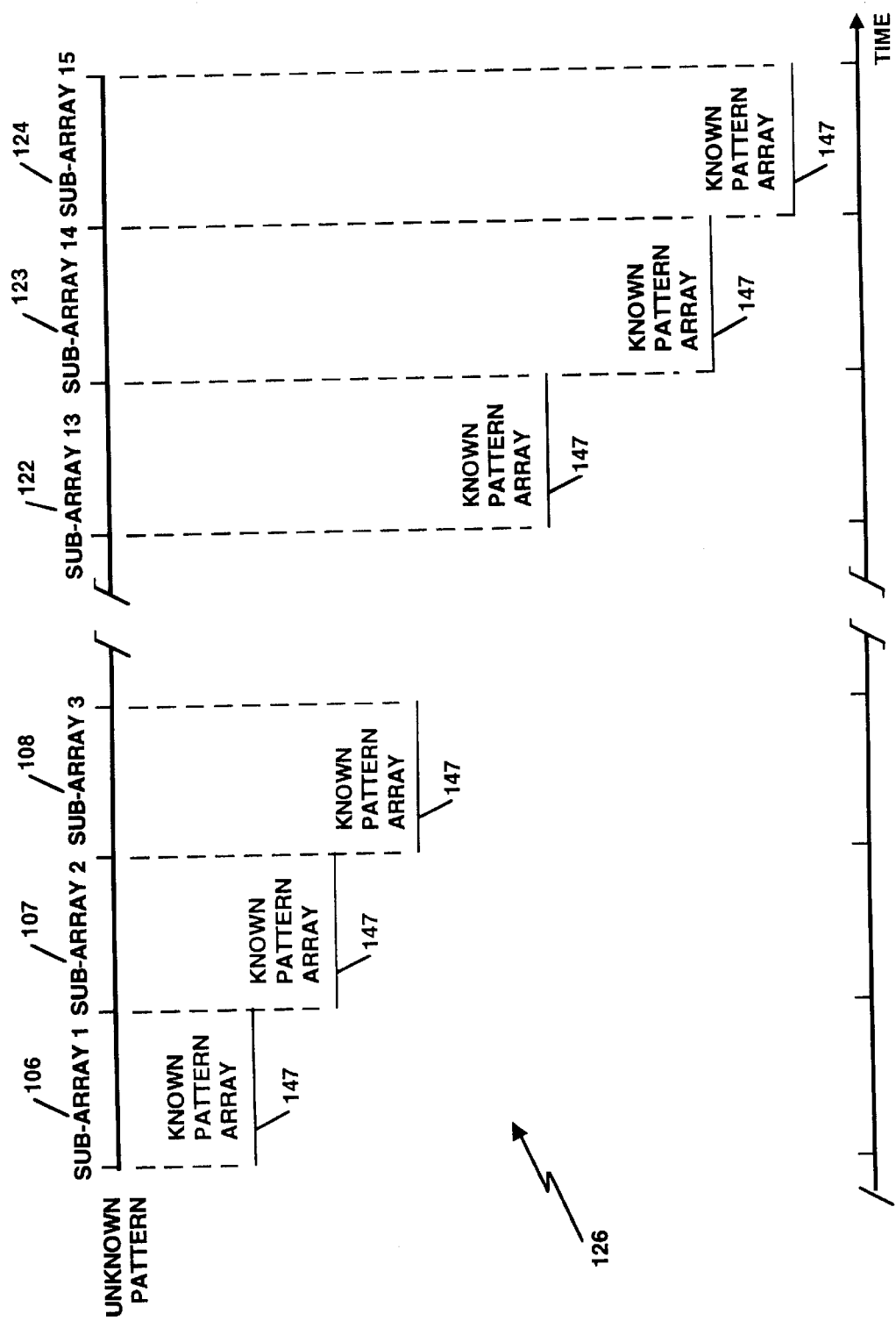
FIG. 8 is a temporal illustration of how the known pattern is sequentially compared against the sub-arrays of known patterns.

As FIG. 8 illustrates, the unknown array 126 comprises fifteen of sub-arrays 106–124. When the unknown pattern 126 is compared against a certain known pattern 147, the first sub-array 106 is complex multiplied by the known pattern 147. When the multiplication is complete, the second sub-array 107 is then complex multiplied by the known pattern array 147. This process is sequentially repeated for each of the remaining sub-arrays 108–124. The result is fifteen sub-arrays of product information, each of which is uniquely associated with one of the fifteen sub-arrays 106–124.

Referring again to FIG. 7, the resultant product sub-arrays are applied to digital-to-analog converters 148,150 which provide analog I and Q signals on lines 152, 154, respectively, to a modulator 156.

Figure 9:
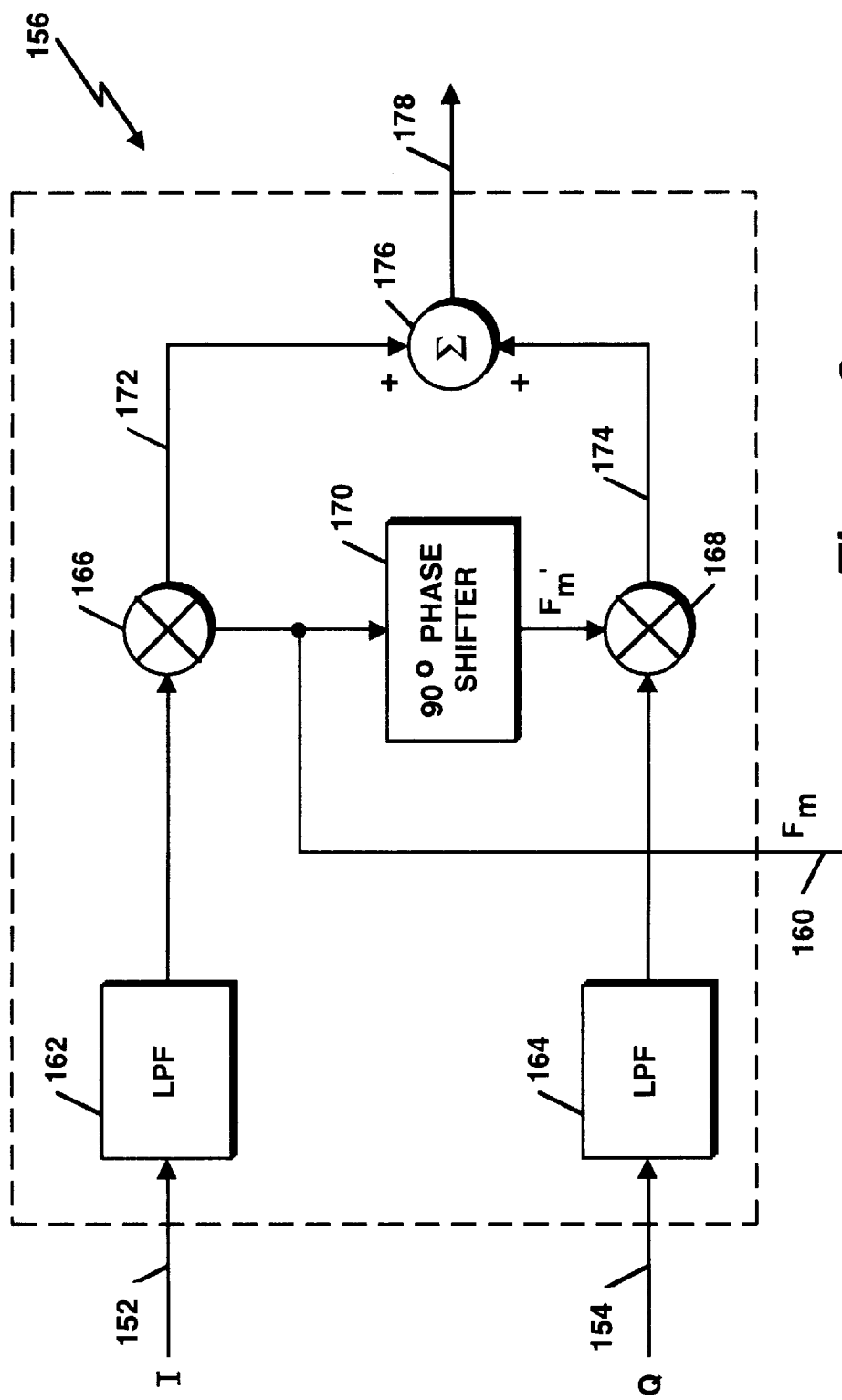
FIG. 9 is a block diagram of the modulator in the fast pattern recognizer illustrated in FIG. 7.

FIG. 9 is a functional diagram of the modulator 156. The modulator receives the I and Q signals on the lines 152, 154 respectively, along with a periodic signal $f_m$ on a line 160. The I and Q signals are each fed to an associated low pass filter 162, 164 and the filtered signals are applied to mixers 166, 168 respectively. Mixer 166 mixes the filtered I signal with the periodic signal $f_m$ to bandshift the signal to the center frequency of the dispersive delay line which shall be discussed in the next paragraph. Similarly, mixer 168 mixes the filtered Q signal with a version $f_m'$ of the periodic signal $f_m$, that has been phase shifted ninety degrees (90°) by phase shifter 170. Each of the mixed signals on lines 172, 174 is then applied to a summing circuit 176, which sums the signals and provides a modulated signal on a line 178.

Referring again to FIG. 7, the modulated signal on the line 178 is applied to a dispersive delay line 180 (i.e., a pulse compression filter). The dispersive delay line 180 is preferably a reflective array compressor (RAC), operative at a center frequency (e.g., 60 MHz) equal to the frequency value of the periodic signal $f_m$ on the line 160. An example of a suitable dispersive delay line is the model 60-20-20 reflective array compressor, available from Phonon, Inc. of Simsbury, Conn. Note, the time-bandwidth product of the dispersive delay line 180 determines the maximum size of the sub-arrays.

As known, the dispersive delay line 180 provides a variable time delay to each spatial-frequency component of the input signal, wherein the delay is a function of the value of the spatial-frequency component, i.e., the delay is proportional to spatial-frequency. The delay line 180 is preferably a surface acoustic wave (SAW) device, wherein the electrical signal on the line 178 is converted to an acoustic wave, which propagates through the delay line 180.

The present invention is mathematically premised on the fact that if an input signal to the dispersive delay line 180 is a linear FM signal (i.e., a chirped signal) centered at the center frequency of the dispersive delay line and matched to the dispersive delay line, then the output of the delay line will be a compressed pulse (i.e., a bounded impulse).

To take advantage of this relationship, the present invention multiplies each of the templates of known patterns by the chirp signal $f_{ch}$ 60 (FIG. 2), which is matched to the dispersive delay line 180. Given this relationship, the complex multiplication of matching complex unknown and known patterns in the complex multiplier 146 (FIG. 7) produces a product in which the phase variations associated with the patterns cancel. This occurs because the known pattern is the complex conjugate of the unknown pattern (note, the product of complex conjugates is a real number). The only remaining spatial-frequency components then are those associated with the matched chirp. Accordingly, the dispersive delay line produces a bounded impulse signal in response to the product indicating that a match has occurred.

The output signal produced by the dispersive delay line 180 is applied to an amplitude detector circuit 184 which produces a signal on a line 186. That signal is fed through a peak detector 181 and converted to a digital signal by an analog-to-digital converter 183. The resulting digital signal is fed to the CPU 25 (FIG. 1). The system also includes a programmable threshold circuit 188 which receives a command signal on a line 190 from the CPU and sets the threshold for the amplitude detector 184 as a function of the command signal value.

As discussed above, the unknown array 126 (FIG. 8) is sub-divided into a number of sub-arrays 106–124 (FIG. 8) and each sub-array is complex multiplied by the known pattern 147 and the resultant product is fed into a modulator. The modulated signal is then applied to the dispersive delay line 180 (FIG. 7) which provides a signal indicative of the correlation level between the known pattern and each of the unknown sub-arrays, and advantageously the spatial location in the unknown pattern where the correlation occurred.

Figure 10:
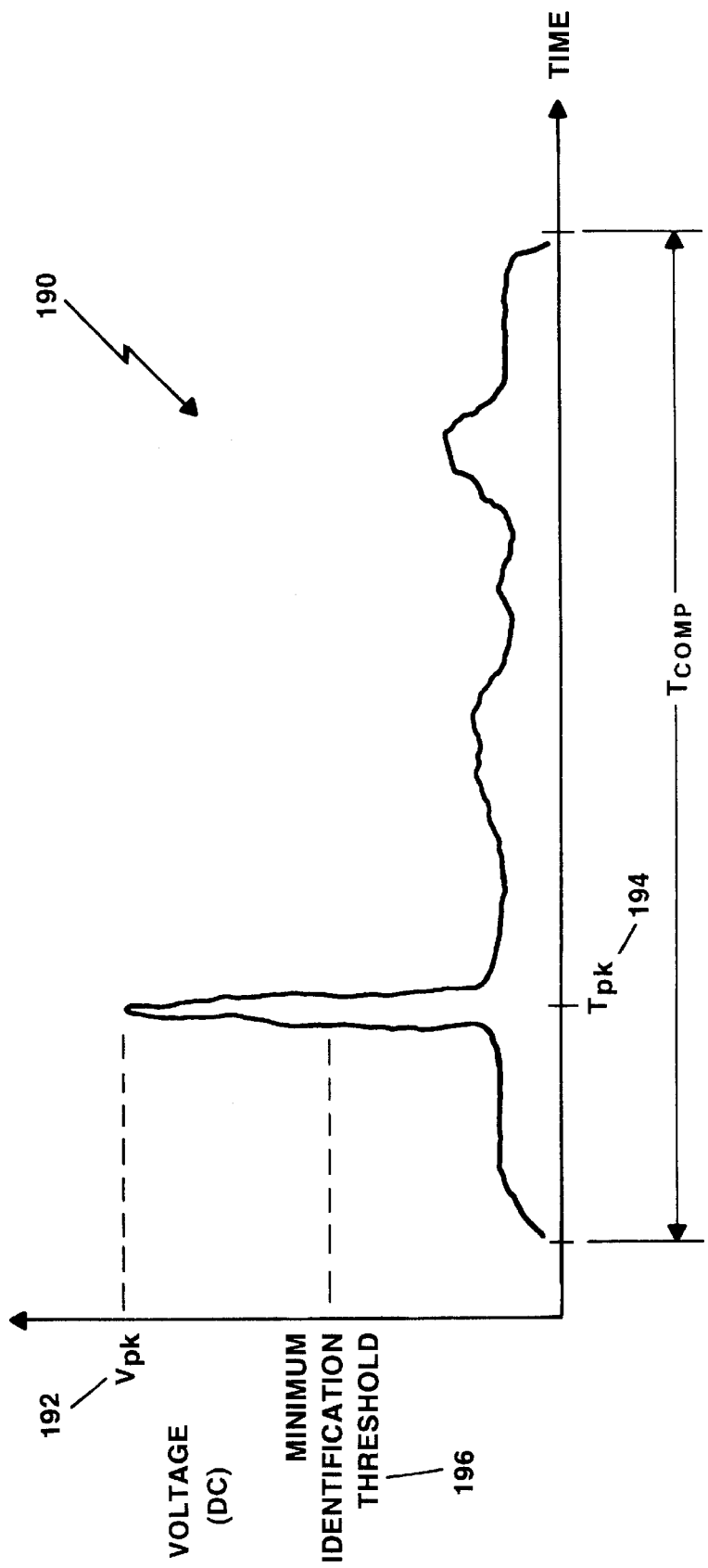
FIG. 10 is a plot of the output signal from the dispersive delay line illustrated in FIG. 7.

For example, consider FIG. 10 which illustrates a plot 187 of the output signal on the line 182 (FIG. 7) versus time. Voltage is plotted along the vertical axis and time is plotted along the horizontal axis. A peak voltage value $V_{pk}$ 192 is indicative of the level of correlation, and the time $T_{pk}$ 194 at which the peak voltage occurs is indicative of the exact spatial location in the unknown pattern which correlated with the known pattern. As shown, the magnitude of the peak voltage value $V_{pk}$ is the largest, and the value is above a predetermined minimum identification threshold value 196.

Since each of the plurality of sub-arrays for the unknown pattern are compared sequentially against the known pattern, the time at which the peak voltage value occurs is indicative of the spatial location in unknown pattern where the best correlation occurred. Advantageously, this provides the "faces in the crowd" identification ability of the present invention. For example, it may take $T_{comp}$ microseconds to compare all fifteen sub-arrays associated with an unknown pattern against a known pattern. The location of the peak voltage value $V_{pk}$ in time can then be used to determine which of the sub-arrays provided the peak voltage value $V_{pk}$ when compared with the known pattern. For example, if there are fifteen sub-arrays and $T_{comp}$ equals 15 microseconds, and $T_{pk}$ occurs at 2.4 microseconds from the start of $T_{comp}$, we know that the third sub-array correlated best with the known pattern. Since we know the exact time at which the peak occurred, we can map from the associated position in the sub-array to the specific spatial location in the original scene. Hence, if there are a number of individuals in the unknown pattern, we can determine the identity of each of those individuals and identify the spatial location where each individual is within the unknown pattern.

The comparison process may be repeated for all the known patterns in a database to determine the best match to the unknown pattern. This is performed by the CPU 25 (FIG. 1), which processes the correlation information received from the card 24 and provides a listing of known individuals rank ordered by their degree of correlation to the unknown pattern. Alternatively, the comparisons may terminate when a match has occurred that has a small probability of being a false identification.

Further processing may be performed to determine if the correlation is reliable. Once the unknown pattern has been compared to the known patterns and rank ordered based upon the magnitude of the output signal value from the dispersive delay line, the mean and standard deviation, sigma, for these signals can be computed and the noise power can then be estimated. This may be performed by processing the correlation signals values located between two and four sigma as follows:

$$\text{Estimated Noise Power} = \frac{\sum_{2\sigma}^{4\sigma} (\text{correlation signal values})^2}{\text{\# of signal values between 2 and 4 sigma}}$$

Using this value of the estimated noise power, a measure of the signal-to-noise ratio of each correlation signal value can then be computed as follows:

$$\text{Signal to Noise Ratio} = \frac{(\text{correlation signal values})^2}{\text{estimated noise power}}$$

For a reliable identification, both the correlation signal value and the corresponding signal-to-noise ratio value should be high.

Based upon early test results it appears that the area around the eyes of a human provides the best information for identification. This observation is primarily based upon the fact that the present invention can accurately identify an unknown individual even when the majority of the face, with the exception of the eyes, is covered.

In addition, early tests indicate that the present invention can accurately identify an individual who has aged approximately twenty-five years and grown a full beard. A test was performed using a recent picture of an individual with a full beard and glasses. This picture was processed as an unknown pattern as discussed above, and compared against a plurality of known patterns that included the person's high school yearbook photograph taken some twenty-five years earlier. In the yearbook photograph, the person was clean shaven and was not wearing glasses. Notwithstanding these changes due to age and physical appearance, the present invention still indicated that there was a high level of correlation between the two photographs, and thus identified the individual in the recent photograph as the same individual in the yearbook photograph.

Rather than utilizing a one-dimensional dispersive delay line, the fast pattern recognizer of the present invention may utilize a two-dimensional dispersive delay line.

Two-Dimensional Processing

Figure 11:
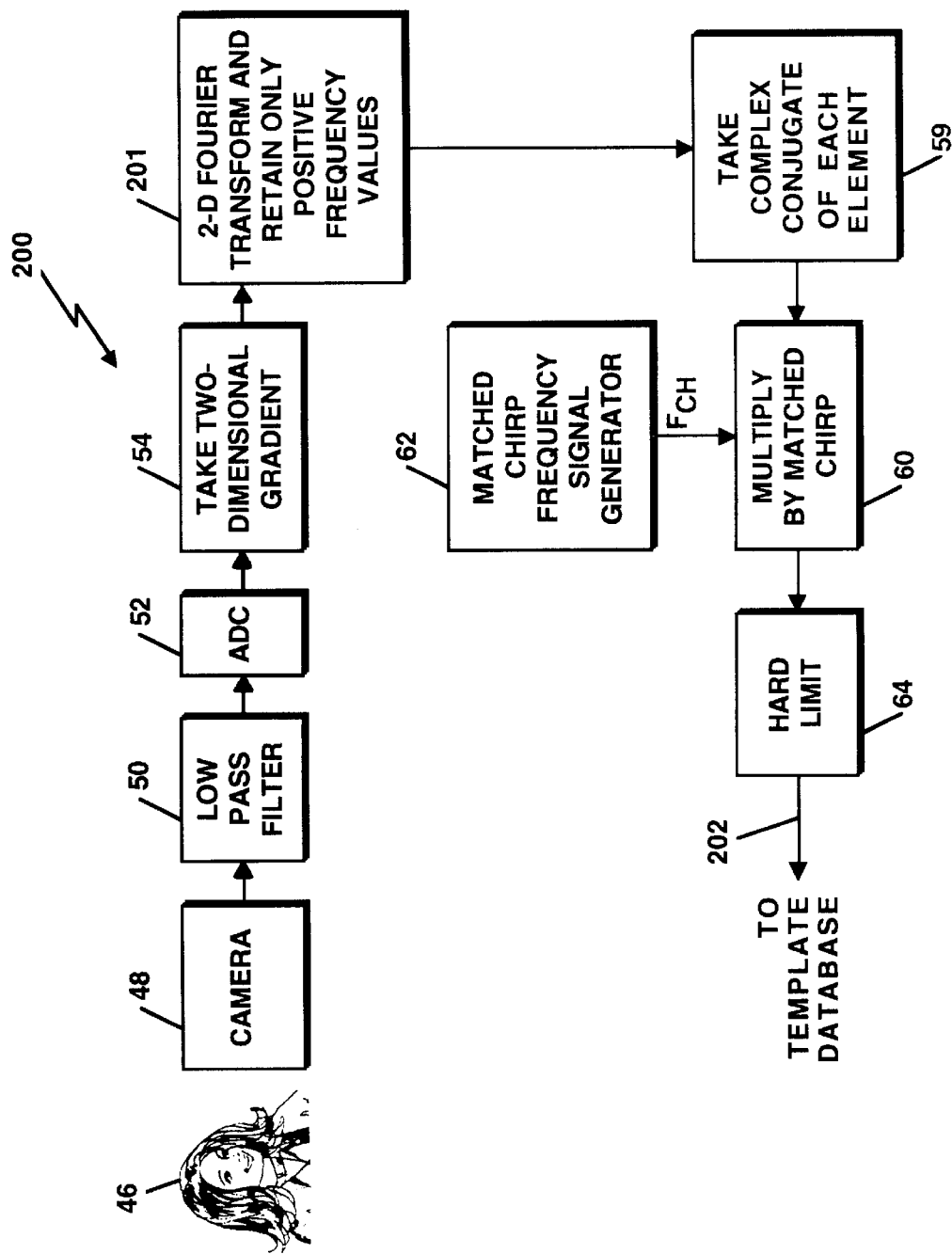
FIG. 11 is an illustration of a functional block diagram of the processing steps performed to create a template of known patterns for the two-dimensional signal processing.

FIG. 11 illustrates a series of processing steps 200 for creating templates of known patterns for use in the two-dimensional processing embodiment of the present invention. This processing is substantially the same as the one-dimensional processing illustrated in FIG. 2, with the principal exception that the conversion from the two-dimensional matrix to the one-dimensional array (see step 56 in FIG. 2) is no longer required. Further, the step of transforming from the spatial domain to the spatial-frequency domain involves taking a two-dimensional Fourier transform as shown in step 201. The result of the signal processing in FIG. 11 is that a two-dimensional matrix representative of the known pattern is provided on a line 202. Note, in FIG. 11 the numerical designators for processing steps similar to the processing steps shown in FIG. 2 have been retained whenever possible in the interest of brevity and clarity.

Figure 12:
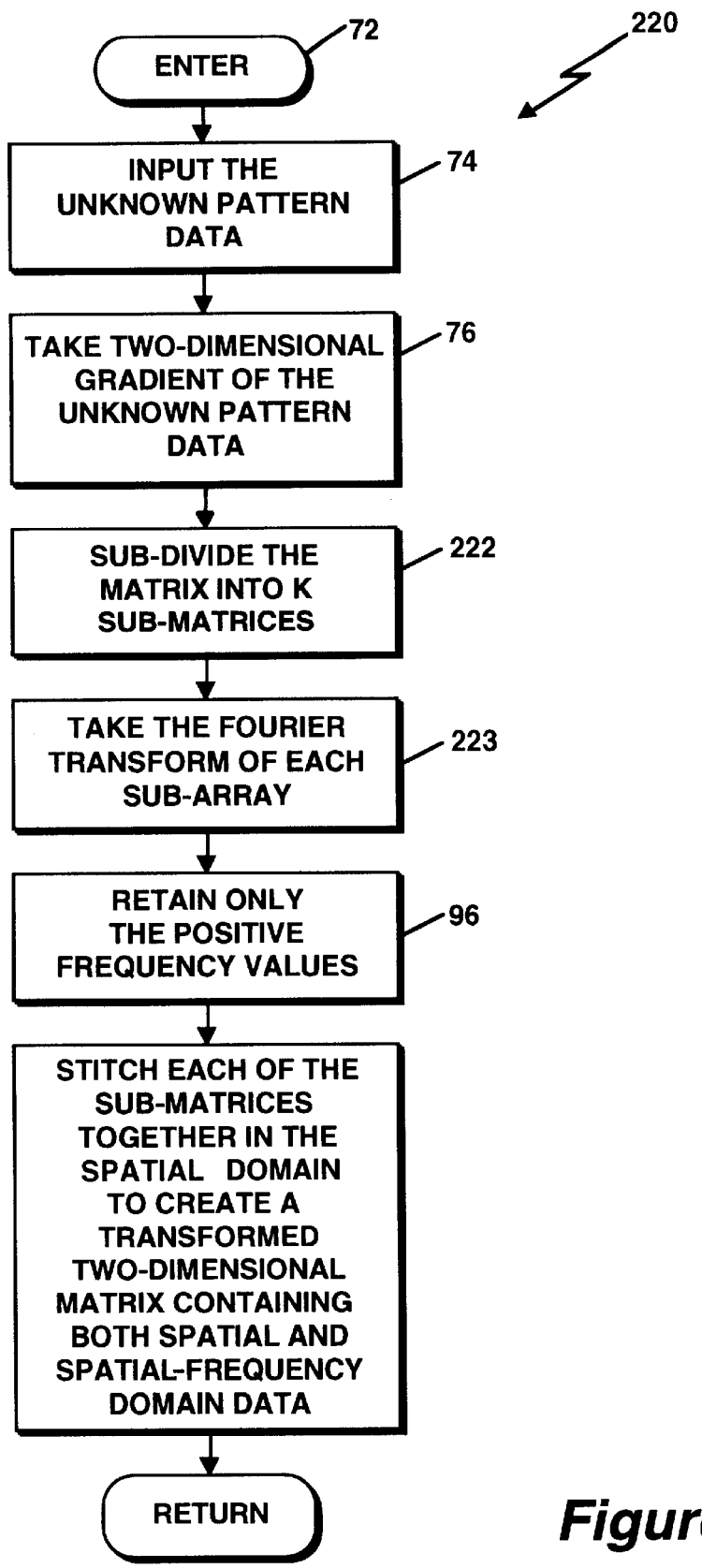
FIG. 12 is a flow chart illustration of the processing steps performed in the two-dimensional signal processing embodiment, to condition the unknown pattern for comparison against the known pattern.

FIG. 12 is a flow chart 220 of the steps involved in processing the unknown pattern by the two-dimensional embodiment of the system. The processing steps illustrated in FIG. 12 are essentially the same as the steps illustrated in FIG. 4, except that the transformation to a one-dimensional array is no longer required and the Fourier transform is a two-dimensional Fourier transform. In this two-dimensional processing embodiment, a two-dimensional matrix of real data is subdivided to provide a plurality of sub-matrices. In particular, referring to FIG. 12, step 222 processes the two-dimensional matrix of gray scale gradient information to sub-divide the matrix into a plurality of sub-matrices. Step 223 then performs a two-dimensional Fourier transformation.

Figure 13:
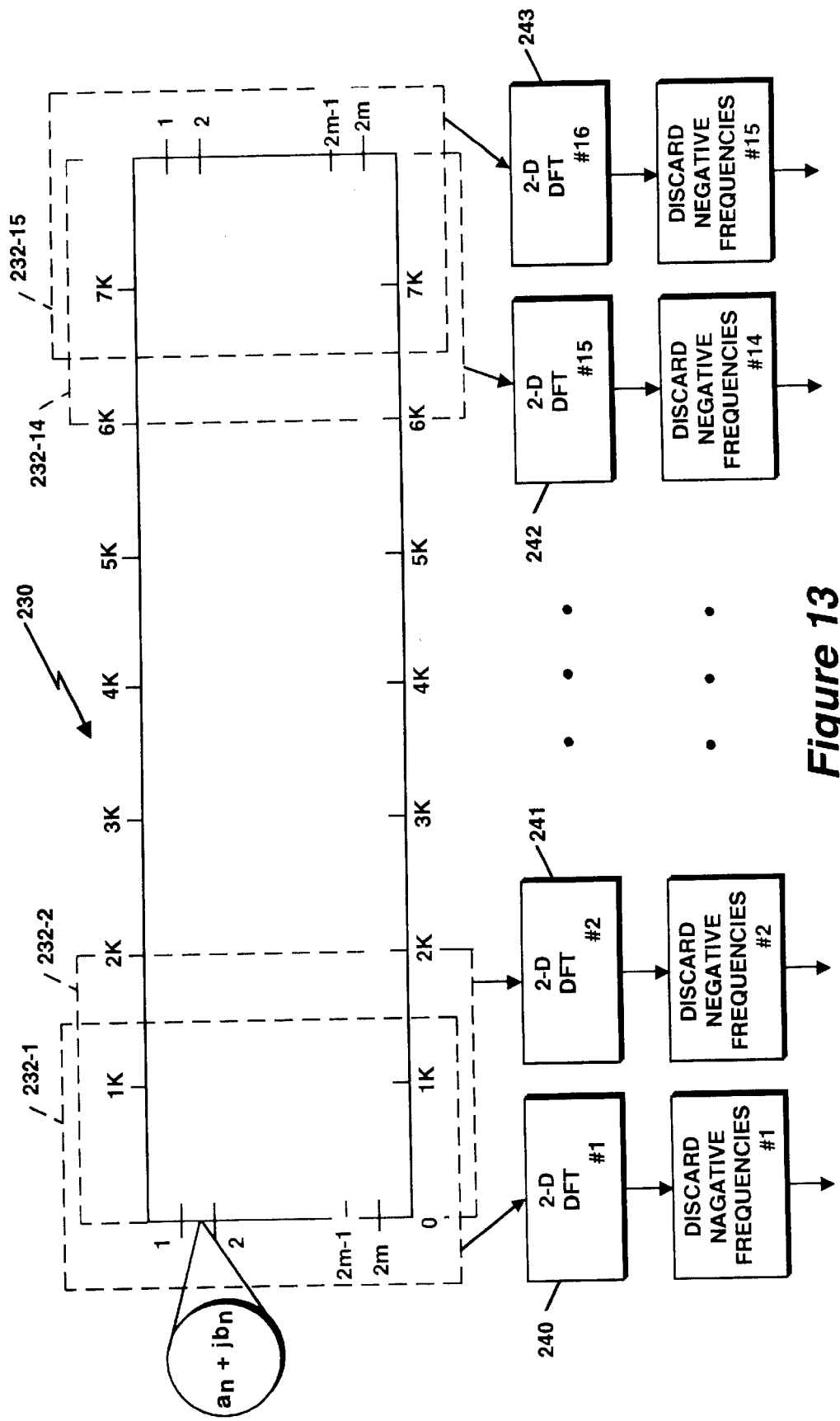
FIG. 13 is a pictorial illustration of a two-dimensional matrix associated with the unknown pattern, and the partitioning of the matrix into a plurality of sub-arrays and processing of the sub-arrays.

Consider for example FIG. 13, which illustrates a two-dimensional matrix 230 of gray-scale gradient information. The matrix 230 includes 2M rows and Z columns of data. Representative values for M and Z may be 128 and 8192, respectively. Referring to FIGS. 12 and 13, step 222 subdivides the matrix 230 into a plurality of overlapping sub-matrices (e.g., fifteen) of equal size (e.g., sub-matrices 232-1, 232-2 . . . 232-14 and 232-15). Each sub-matrix 232 includes 2M rows and 2,048 columns of gradient data. (Note, as shown in FIG. 13, although the number of rows in each sub-matrix 232 appears greater than the 2M number of rows in the matrix 230 for ease of illustration, the number of rows in each sub-matrix 232 is actually equal to the number of rows in the matrix 230.) To compensate for the shifting, the first two-hundred fifty-six (256) columns of sub-matrix 232-1 are padded with zeros. The second sub-matrix 232-2 is the same size as the first sub-matrix 232-1 and shifted to the right by five hundred twelve (512) columns. Note, the final two hundred fifty six (256) columns of the fifteenth sub-matrix 235-15 are also padded with zeros during the step of sub-dividing, again to compensate for shifting.

Each of the sub-matrices is then applied into an associated one of a plurality of two-dimensional Fourier transforms (e.g., FFTs) 240–243. The FFT's convert the gradient information from the spatial domain to the spatial-frequency domain. The output from each FFT is then filtered to discard the negative spatial-frequency values, and thus reduce the size of each unknown pattern sub-matrix from (2M×2048) elements to (M×1024) elements.

Figure 14A:
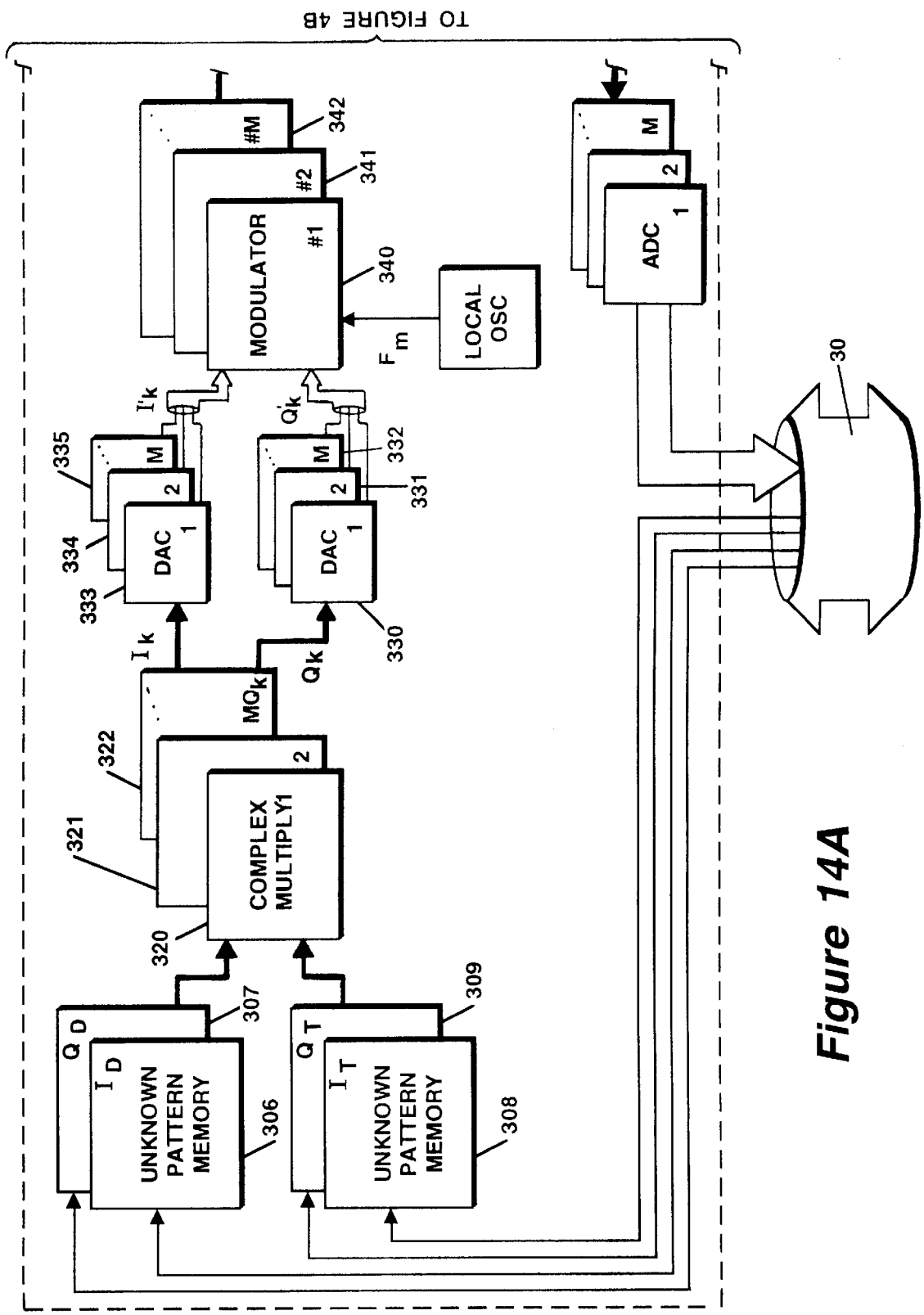
FIG. 14 is a block diagram of a fast pattern recognizer expansion card which includes a two-dimensional dispersive delay line.
Figure 14B:
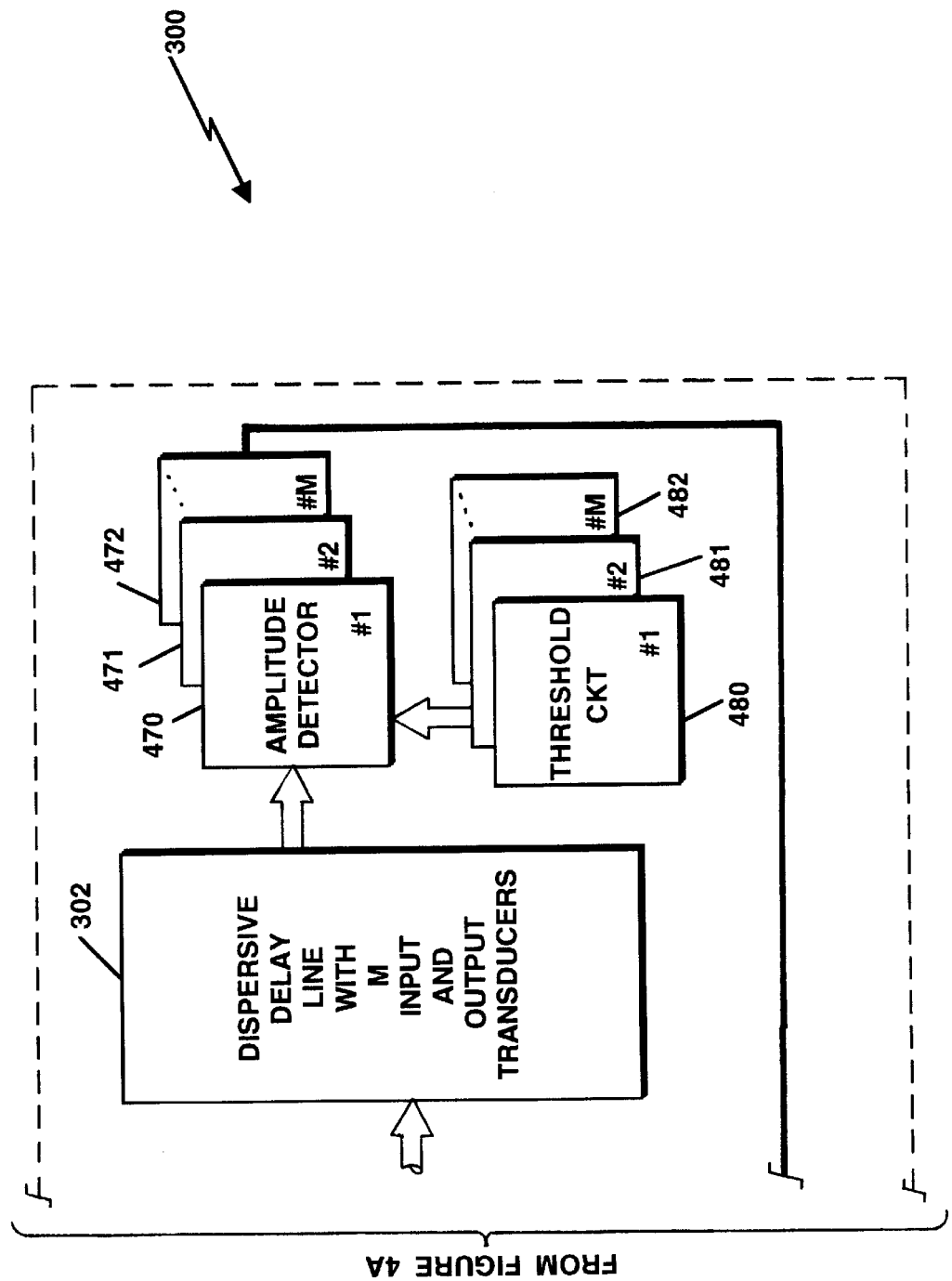

FIG. 14 illustrates a functional block diagram of a fast pattern recognizer expansion card 300. This expansion card 300 includes a two-dimensional dispersive delay line 302, rather than the one-dimensional dispersive delay line 180 of the expansion card shown in FIG. 7. The delay lines 302, 180 differ primarily in that the delay line 302 includes a plurality of input and output transducers, while the delay line 180 uses a single input and a single output transducer.

The expansion card 300 receives each of the transformed sub-matrices (e.g., sub-matrix 232, FIG. 13) via the expansion card bus 30. The in-phase (I) and quadrature (Q) components of each sub-matrix 232 are stored in data memories 306, 307, respectively. Similarly, a template associated with a known pattern and containing I and Q components is fed from the CPU 25 (FIG. 1) to template memories 308, 309 via the expansion card bus 30. Each of the memories 306–309 is preferably a static RAM (i.e., SRAM) with relatively fast data access time. However, one of ordinary skill will appreciate that various types of electronic memory devices (e.g., DRAM, flash RAM, etc.) may be used, depending upon the particular implementation of the present invention and the system design requirements of the end user.

The data memory devices 308, 309 resident in the expansion card 300 should be large enough (e.g., 128 K) to store a plurality of known patterns. This allows the CPU 25 (FIG. 1) to write a plurality of known patterns to the memory devices. This ensures that neither the CPU 25 (FIG. 1) nor the limited throughput of the expansion card bus 30 (FIG. 1) slows down the operation of the expansion card 300 by requiring it to access the data base each time a new known pattern is required for comparison. The size and speed of the memory devices are selected to ensure that sufficient buffer capability is available to reduce the amount of time during which the expansion card 300 is not comparing known and unknown patterns because of a lack of available data.

Dual sets of parallel memories may be employed instead such that the CPU can write data to a first set of the memories while the second set of memories is supplying data to the complex multipliers. Once all the data in the second memories have been output, a switch occurs and data are read from the first memories while the CPU writes to the second memories. This switching back and forth (i.e., "ping-ponging") increases the utilization of the system.

To compare each of the unknown pattern sub-matrices to the known pattern (both in the spatial-frequency domain), a plurality of complex multipliers, e.g., 320–322, receive the I and Q signals from each memory device and perform a complex multiplication. Each of the complex multipliers is associated with one of the rows of each sub-matrix, such that, if there are M rows in each transformed and filtered sub-matrix, there will preferably be M complex multipliers. Advantageously, this allows each row of data in an unknown pattern sub-matrix to be compared simultaneously to its corresponding row of data in the known pattern.

Each complex multiplier provides a first sub-array indicative of the in-phase (I) product, and a second sub-array indicative of the quadrature (Q) product. Hence, there will be a plurality of I and Q signals which can be represented as $I_k$ and $Q_k$, where k is an integer ranging from 1 to M, and M equals the number sub-arrays (i.e., M equals the number of rows in each transformed sub-matrix).

Each of the $I_k$ and $Q_k$ components is applied to an associated one of a plurality of digital-to-analog converters (DACs) 330–335, which provide analog values of $I_k$ and $Q_k$, represented as $I'_k$ and $Q'_k$. Each of the analog values $I'_k$ and $Q'_k$ is then applied to an associated one of the M parallel modulators 340–342. The modulators 340–342 are substantially the same as the modulator shown in FIG. 9, and each provides an output signal to one of the M input transducers of the dispersive delay line 302. The delay line 302 is preferably a reflective array compressor (RAC).

Figure 15:
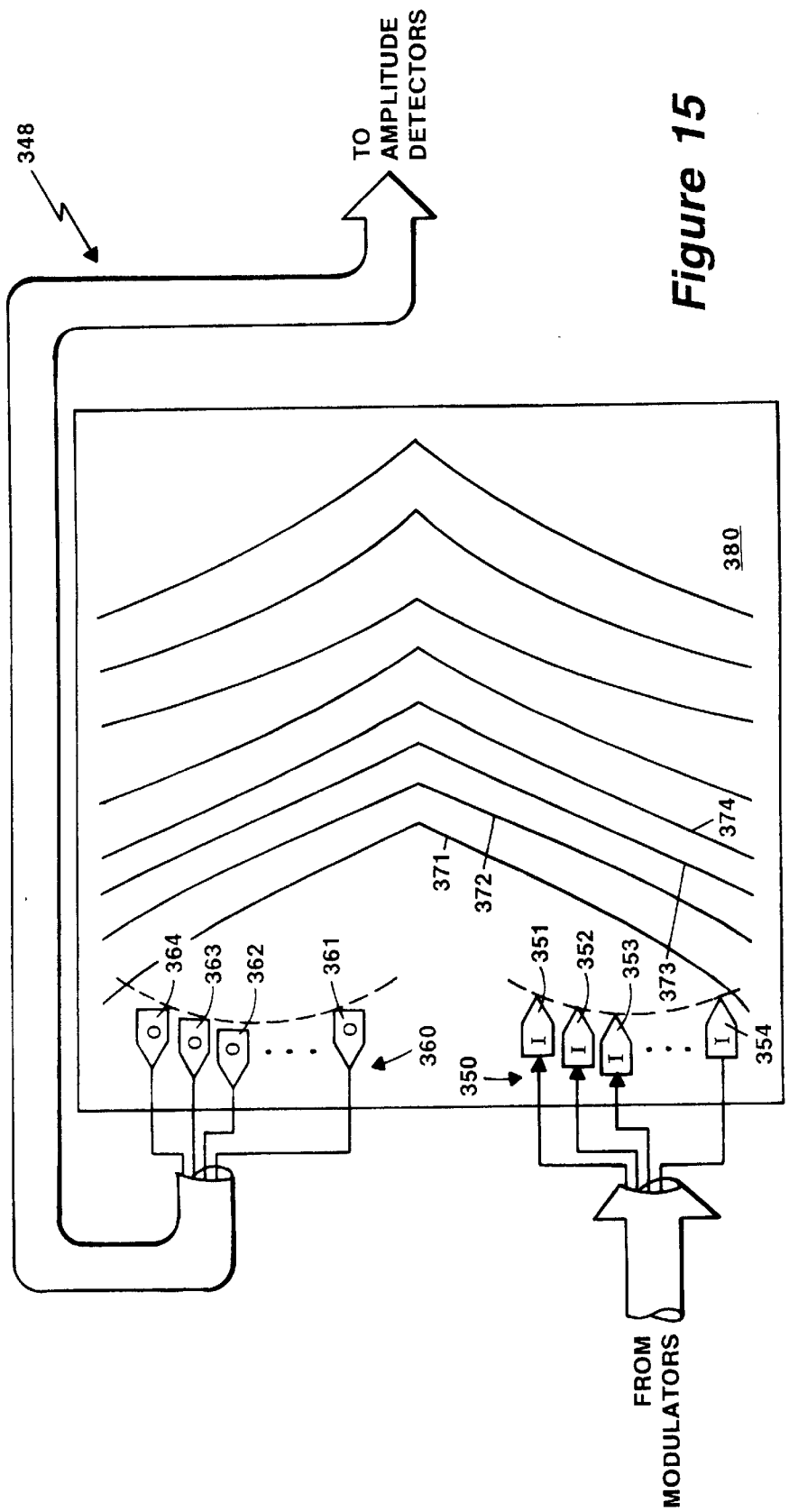
FIG. 15 is an illustration of a two-dimensional reflective array compressor.

FIG. 15 illustrates an embodiment of a two-dimensional RAC 348 that includes an array 350 of M input transducers (e.g., 351–354) and an array 360 of M output transducers (e.g., 361–364). The RAC 348 also includes a plurality of reflectors (e.g., 371–374) etched into or deposited onto a lithium niobate substrate 380, or a similar substrate to form two reflector stacks. Both arrays 350, 360 are curved, as shown, to assist in focusing the input energy on a localized spot of the output array when each of the input signals is the matched chirp signal $f_{ch}$. An advantage of the two-dimensional dispersive delay line over the one-dimensional dispersive delay line 180 (FIG. 7) is the increase in processing speed, since the two-dimensional device processes M signals simultaneously.

The shape of the reflectors is tailored to provide the desired transfer function from input to output. In general, the reflectors are curved such that when all the input transducers are driven simultaneously with the matched chirp signal $f_{ch}$, a compressed pulse appears at the center of the output array. In addition, the delay line will provide a compressed pulse at an output transducer offset from the center of the output array, when all the input transducers are driven with the signal $f_{ch}$ each having a phase shift $\phi_i$, where the amount of phase shift applied to each signal is linearly proportional to the location along the input array to which the signal $f_{ch}$ is applied. Given this set of inputs, the compressed pulse will be provided at an output transducer offset from the center of the output array by amount which is proportional to the rate of change of the phase shift.

Referring again to FIG. 14, the dispersive delay line 302 provides a plurality of output signals (each uniquely associated with a particular row of the sub-matrices) to an associated one of a plurality of amplitude detectors 470–472. Each amplitude detector includes a uniquely associated programmable threshold circuit 480–482 which allows the CPU 25 (FIG. 1) to set the threshold value for each amplitude detector. However, one programmable threshold circuit may be sufficient since it is contemplated that each threshold will be set to the same value.

Figure 16A:
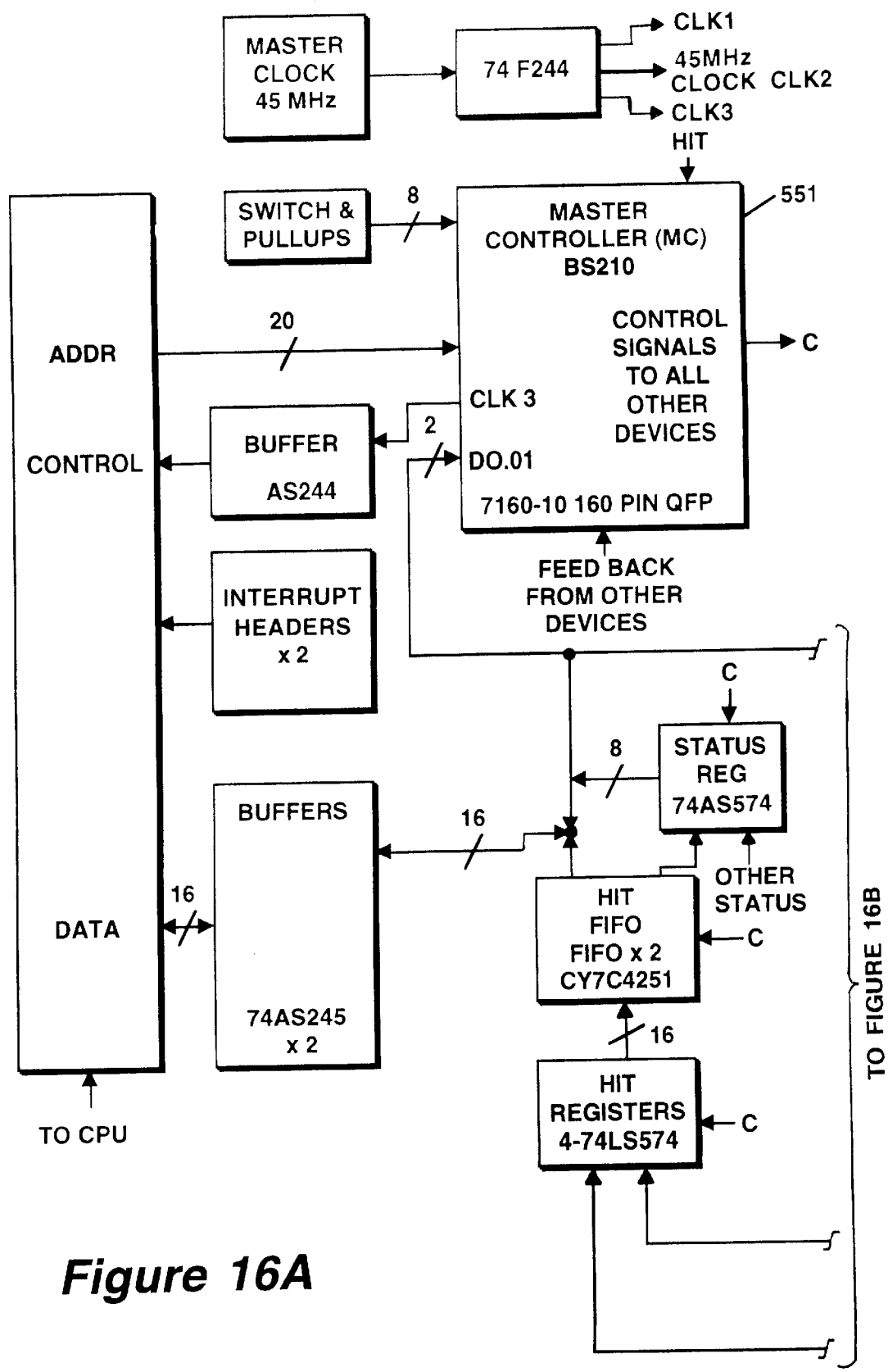
FIG. 16 is a block diagram illustration of digital circuitry resident on the fast pattern recognizer expansion card illustrated in FIG. 7.
Figure 16B:
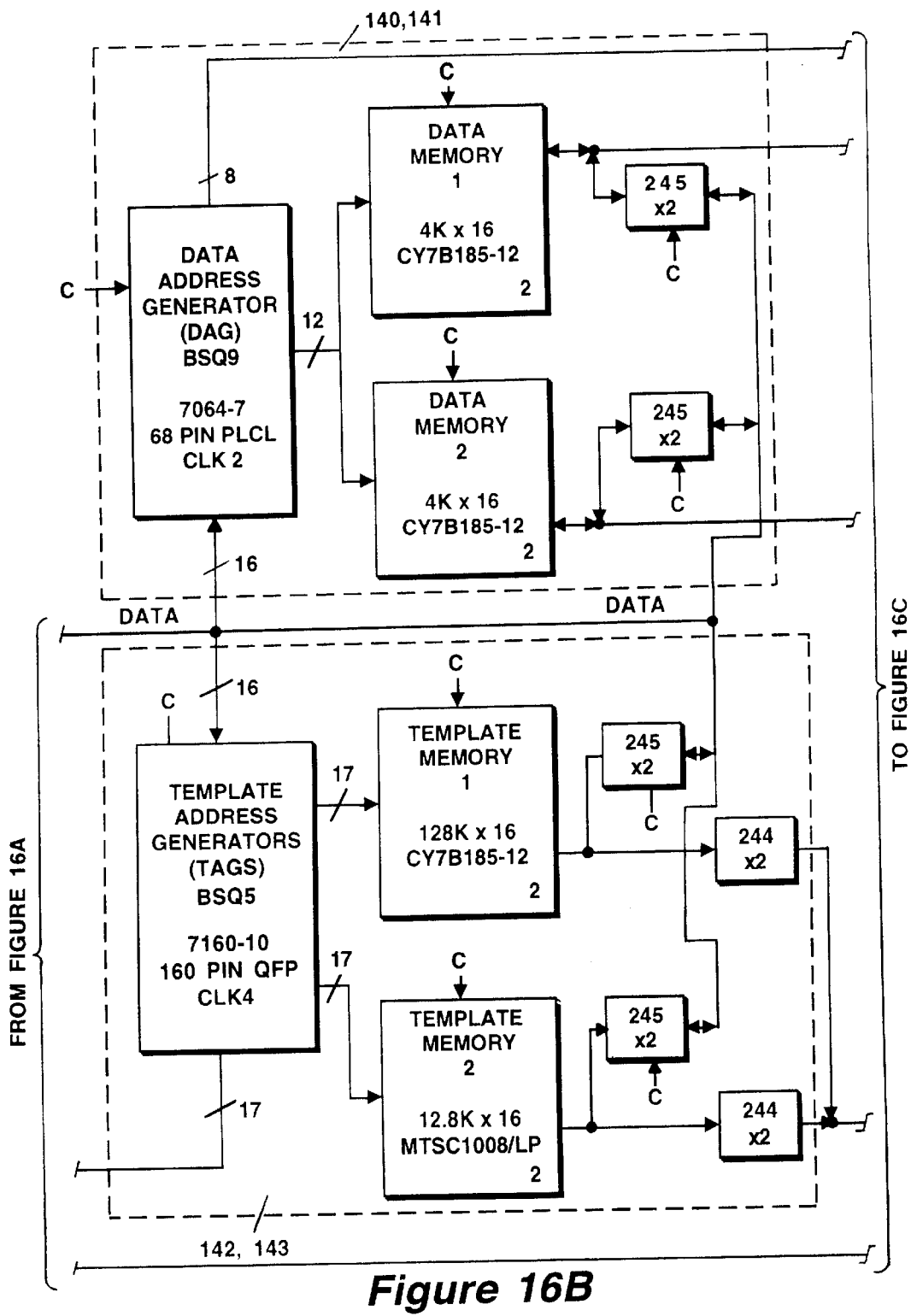
Figure 16C:
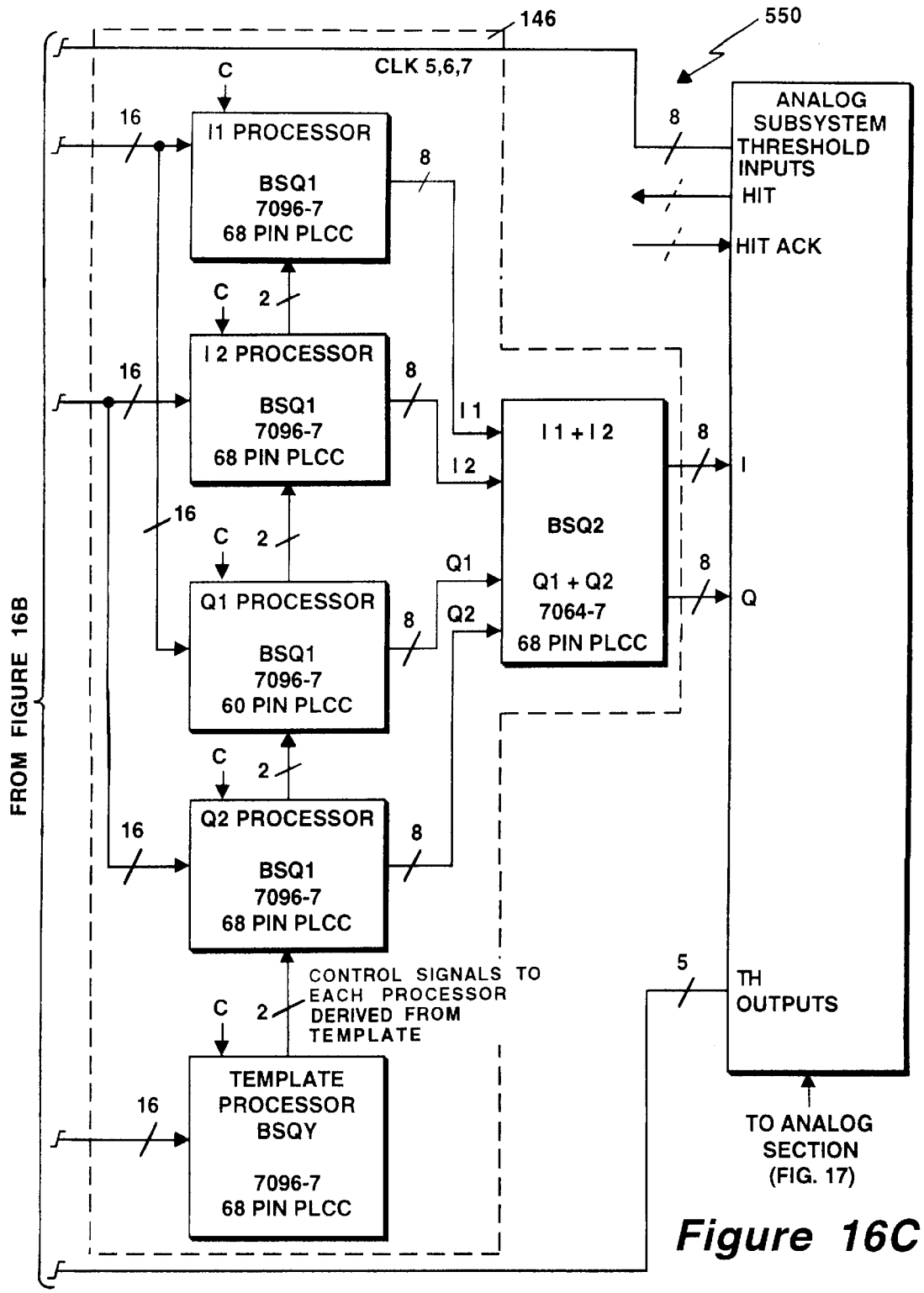

FIG. 16 is a schematic block diagram 550 of components used to implement the digital portions of the expansion card 24 (FIG. 7). As shown, the system includes a controller 551 which controls the operation of the expansion card. The CPU 25 (FIG. 1) feeds the known and unknown templates to the expansion card and the patterns are stored in the memories 140–143. These memories then provide data to the complex multiplier 146 which may be implemented in several programmable logic arrays. The resultant I and Q signals are then fed to DACs 148, 150 which are illustrated in detail in FIG. 17.

Figure 17A:
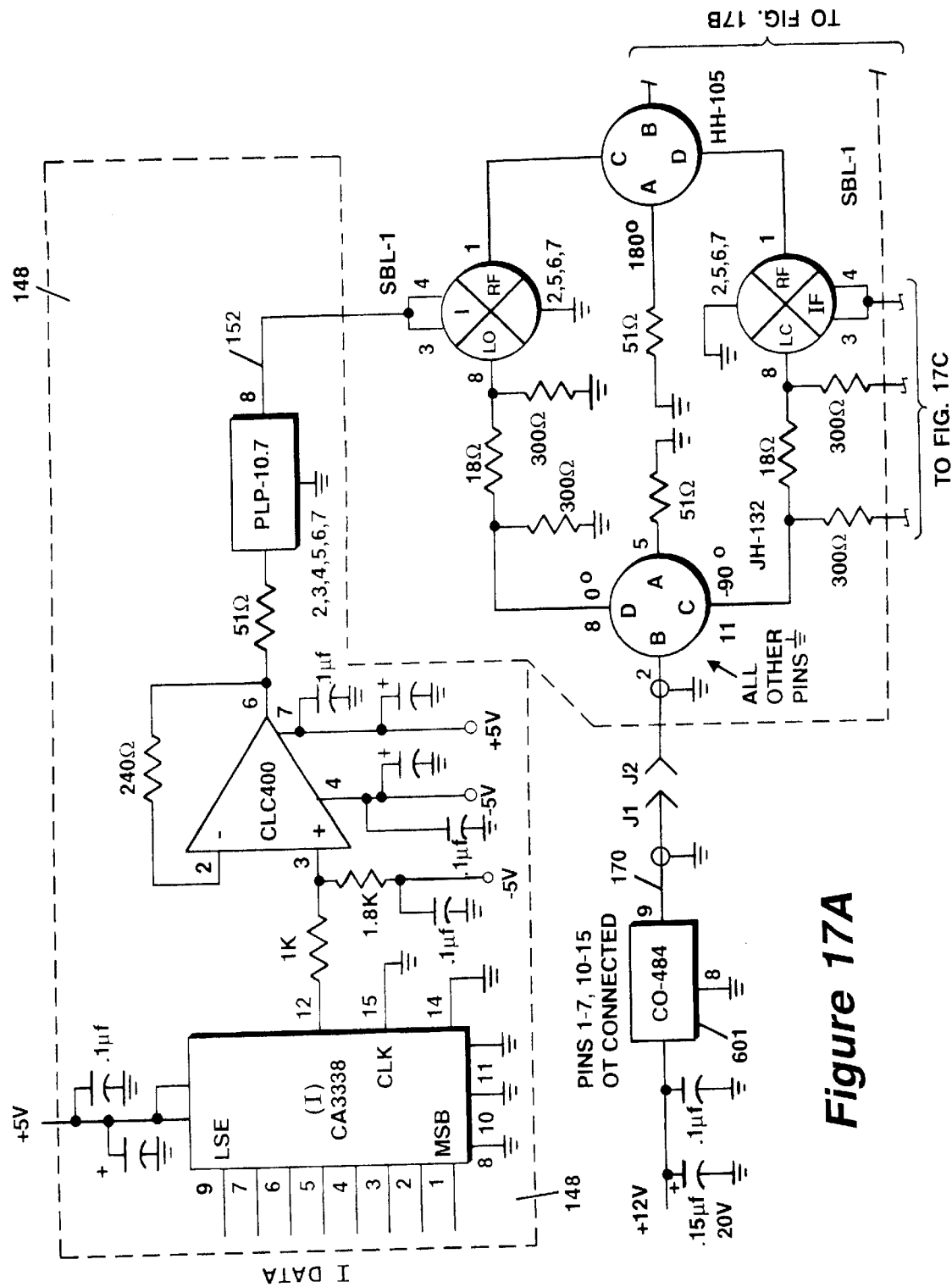
FIG. 17 is a schematic illustration of the analog circuitry resident on the fast pattern recognizer expansion card.
Figure 17B:
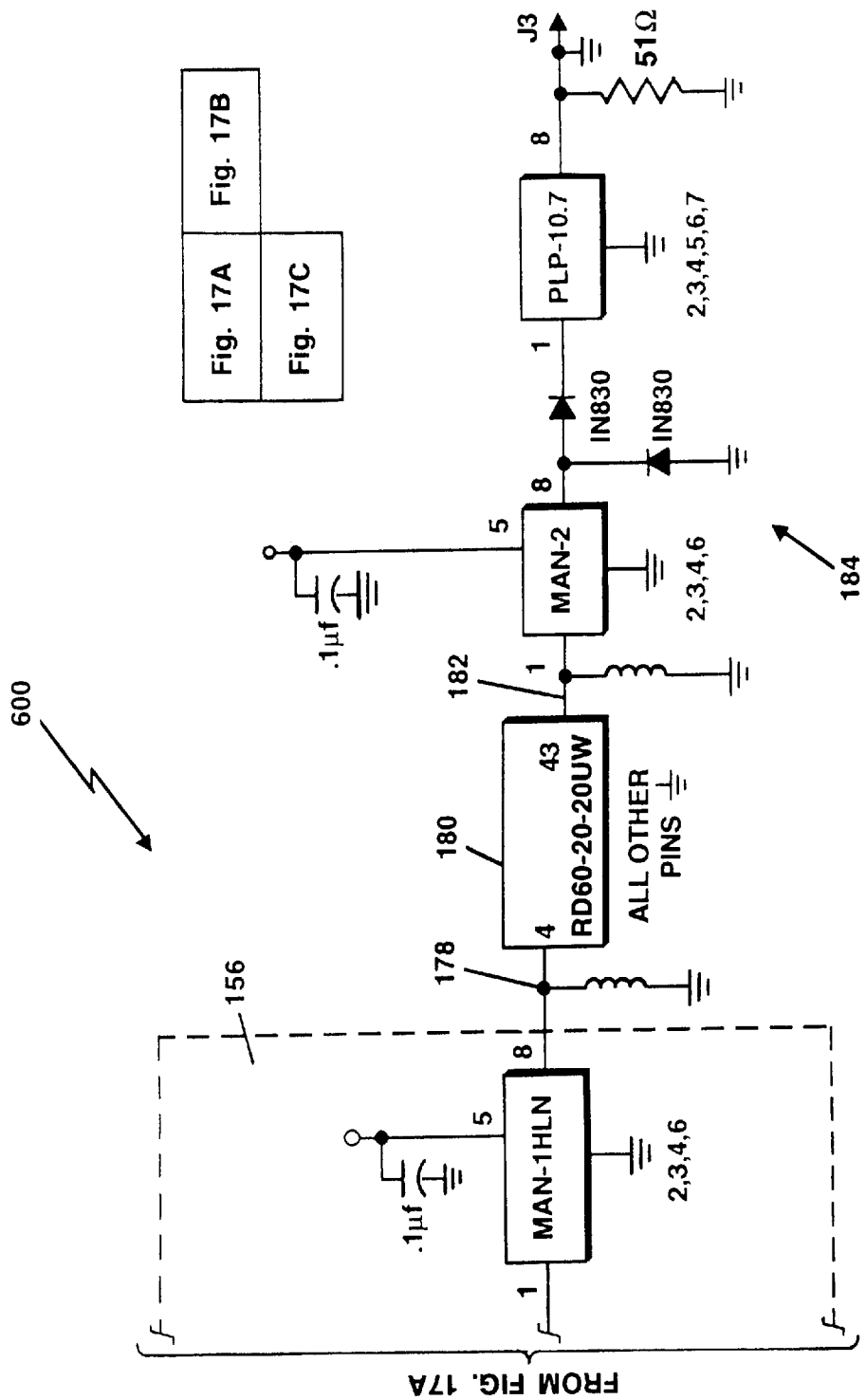
Figure 17C:
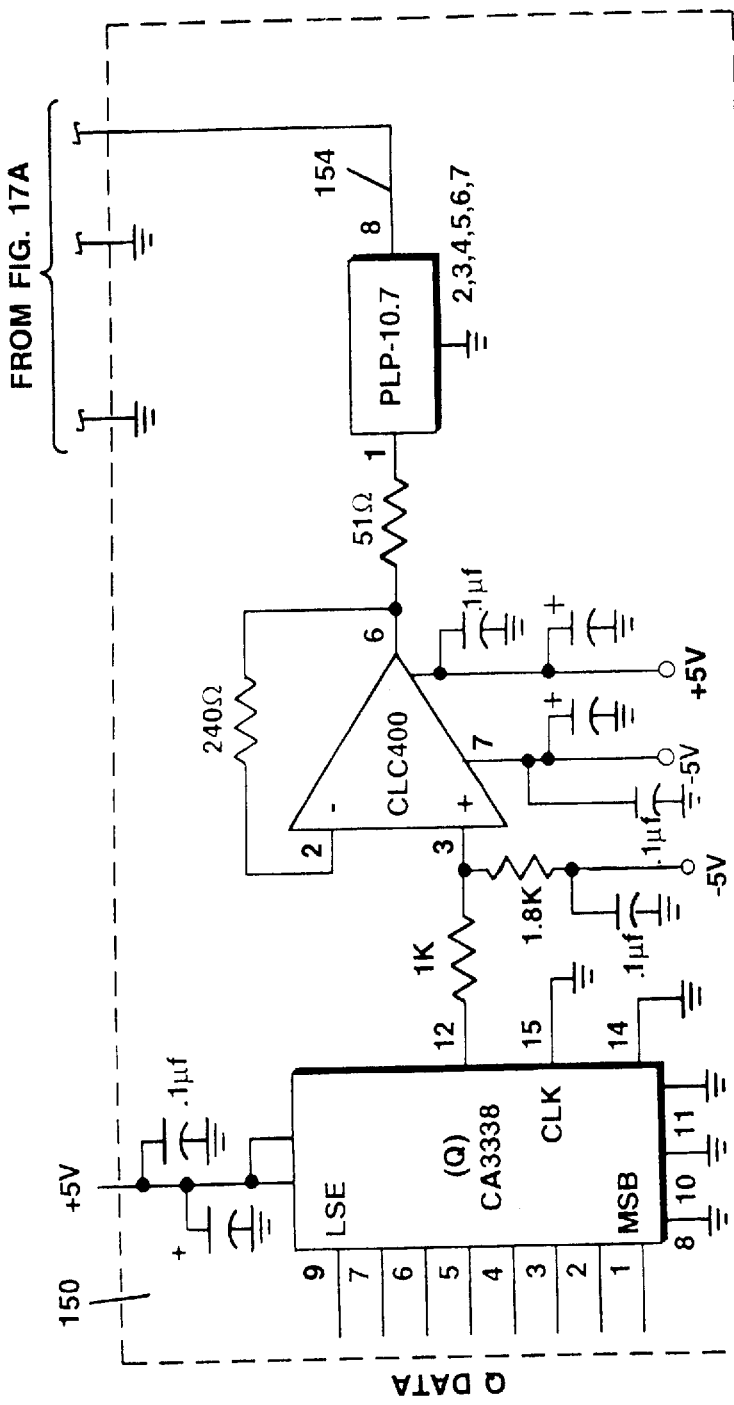

FIG. 17 is a schematic diagram 600 of an embodiment which performs the analog signal processing of the expansion card 24 (FIG. 7). As shown, an oscillator 601 provides the signal $f_m$ on the line 170 and applies the signal to the modulator 156 which generates and applies the modulated signal to the dispersive delay line 180. The delay line 180 provides an output signal on the line 182, which is applied to an amplifier and the peak detector circuit 184. The resultant peak detected signal is then fed into a low pass filter and the filtered signal is routed to the digital board illustrated in FIG. 16 where the signal is sampled by an analog-to-digital converter. One of ordinary skill will appreciate that there are a number of different circuit embodiments for implementing the processing of the present invention, and that the embodiment illustrated in FIGS. 16 and 17 is just one such embodiment.

Figure 18:
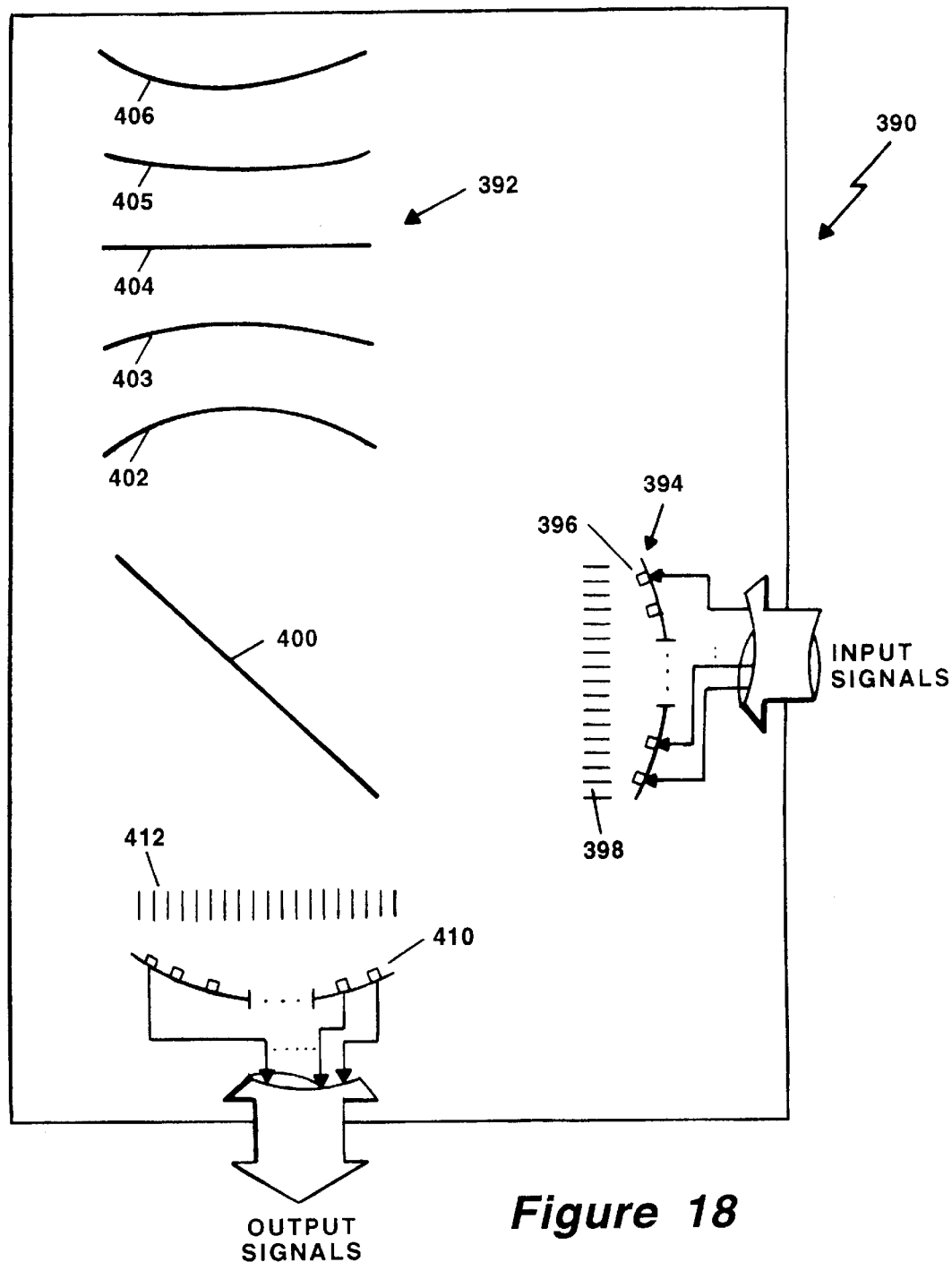
FIG. 18 is an illustration of an alternative embodiment reflective array compressor.

FIG. 18 illustrates an alternative embodiment of a two-dimensional RAC 390 that employs only a single reflector stack 392. This RAC includes a curved array 394 of M input transducers (e.g. 396), each of which launches a surface wave through a collimator 398 towards a beam splitter 400. Each input surface wave strikes the beam splitter and is redirected toward the single stack of reflectors 392. The shape of reflectors 402–406 is chosen to provide the desired device transfer function, and the output waves are detected at a curved array 410 of M output transducers. The device also includes an output collimator 412.

The collimators 398, 412 each comprise an array of partitions (either absorbers or reflectors) oriented so that acoustic energy which is propagating parallel to the partitions passes through the channels between the partitions. Acoustic energy which propagates in non-parallel directions strikes the partitions and is thus blocked from passing through the channels.

Other techniques may be used to decouple the possible direct path between the input array 384 and the output array 410. First, the input and output transducer apertures may be several acoustic wavelengths long (e.g., five or more acoustic wavelengths long). The input transducers will thus launch an acoustic wave most strongly in the forward direction, and the output transducers will detect with the most sensitivity in the forward direction, thereby reducing the lateral coupling between the two arrays. Second, the amplitude of the acoustic wave launched by the input array 394 may be Gaussian weighted across the face of the array. Other known weighting techniques may also be employed. Those skilled in the art will recognize that this reduces the amount of acoustic energy launched laterally toward the output array 410. Each of these two techniques and the collimators may be employed alone or in combination, either in whole or in part, to reduce the undesirable direct coupling between the input and output arrays.

Figure 19:
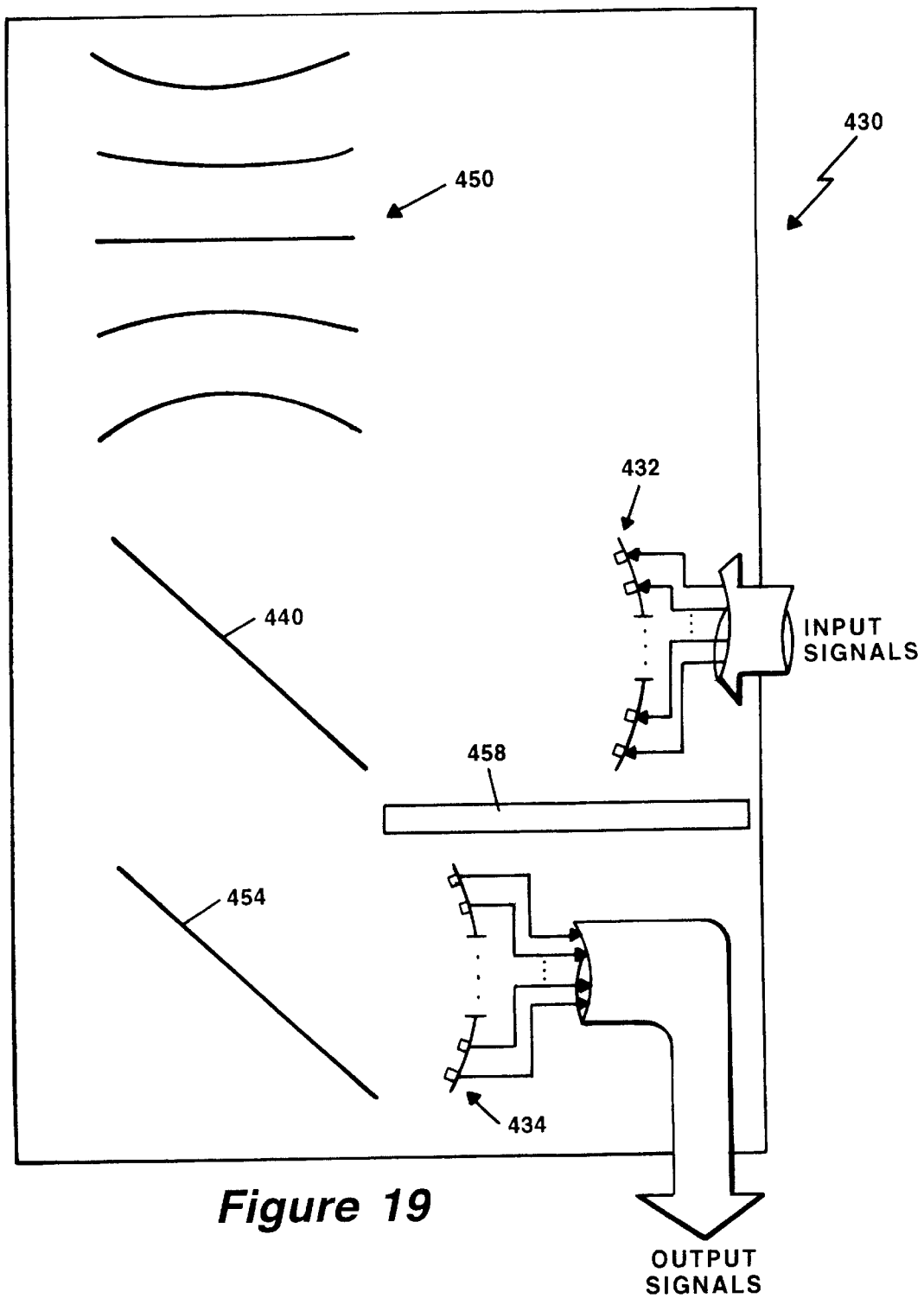
FIG. 19 is an illustration of yet another alternative embodiment reflective array compressor.

FIG. 19 is an illustration of an alternative embodiment of a reflective array compressor 430 which virtually eliminates direct coupling between input and output arrays 432, 434, respectively. Acoustic waves from the input array 432 strike a beam splitter 440 and are directed to a single stack of reflectors 450 whose characteristics (i.e., spacing and curvature) are chosen to provide the desired transfer function for the compressor. Acoustic waves reflected from the stack of reflectors then pass through the beam splitter 440 and strike a reflector 454, which directs the energy to the output array 434 of M output transducers. Advantageously, energy from the input array 432 can only reach the output array 434 by reflecting off the stack of reflectors 450, thus significantly reducing any undesirable coupling. Collimators (not shown) may be used to further reduce any residual undesirable coupling along with an absorbing strip 458. Although the input and output arrays are illustrated as curved, in principle, both the input and output arrays may be placed in straight lines, and the desired transfer function characteristics may be achieved by solely shaping the stack of reflectors. In addition, the curved arrays may be either convex or concave.

An advantage of the present invention is that the comparison between a known and unknown pattern in the one-dimensional embodiment is so fast (e.g., 11,000 comparisons/sec.), that the unknown pattern can be compared against a large data base of known patterns within a reasonable time period in order to identify the unknown pattern.

To ensure that the unknown pattern is suitable for comparison against the known patterns stored in database, additional preprocessing of the unknown pattern may be required before a reliable comparison can be made. For example, the scaling range of the unknown pattern may have be adjusted to make the object smaller or larger. It is contemplated that such a step will be required where the pattern recognition system of the present invention is used to identify faces from pictures taken from a non-standard distance. That is, the database of known individuals may include pictures of the individuals taken from eight (8) feet plus or minus a foot. If the picture of the known individual was taken from a distance of fifteen feet, then the unknown pattern will have to be re-scaled to eight feet nominally before reliable comparisons can be made to the known patterns.

Figure 20:
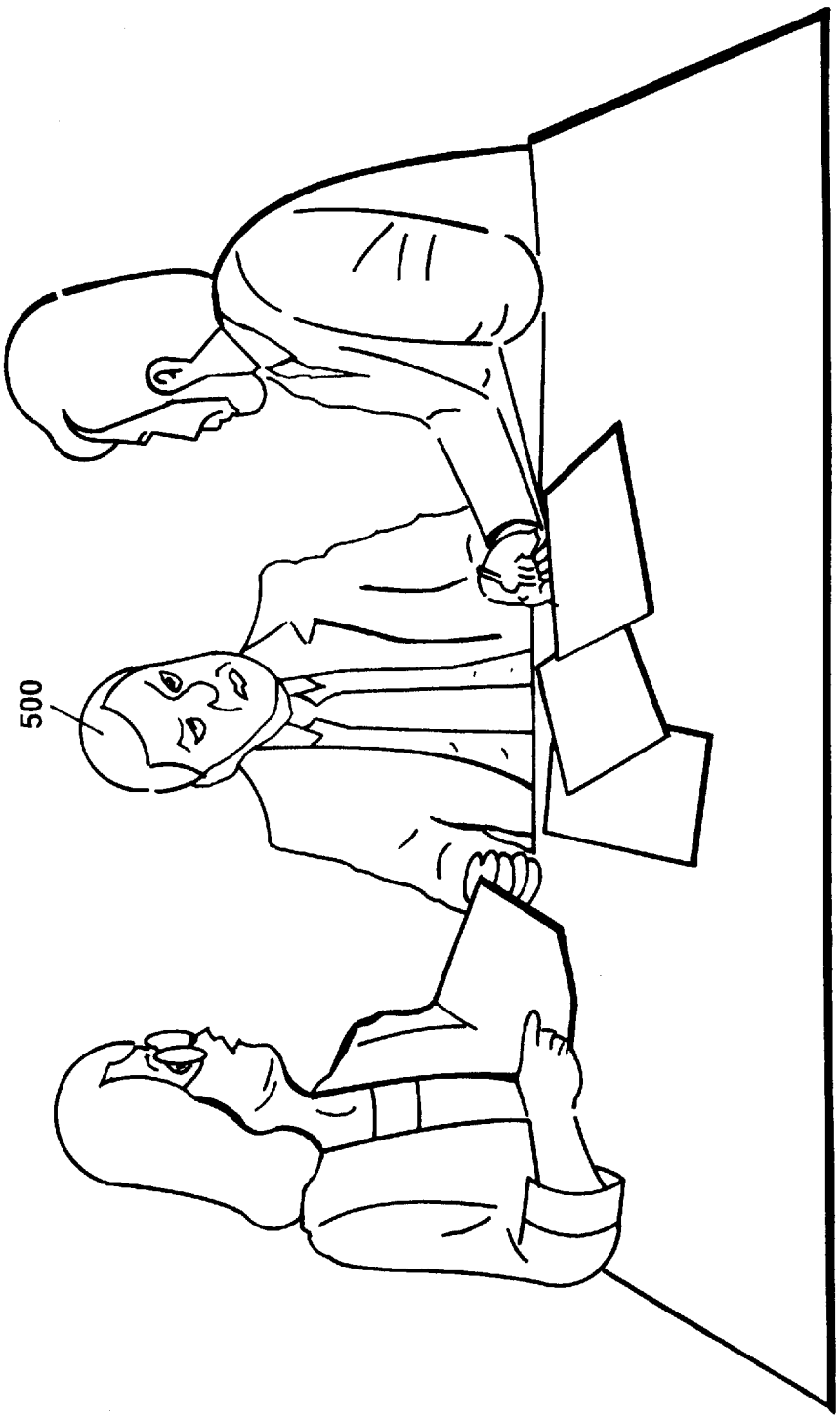
FIG. 20 is a pictorial illustration of an image of an unknown individual which is rotated from the nominal vertical position.

Similarly, the system may have a limit on the image plane rotation (i.e., the angular alignment) of the unknown pattern. For example, FIG. 20 illustrates a picture of an individual 500 whose head is rotated from the vertical position. If the rotation is too large and it is not compensated for, then a proper match may never be detected. Therefore, the rotation of the unknown individual's head may have to be compensated for prior to comparisons against known patterns.

There are a number of uses for the present invention and several may require a slightly different implementation of the fast pattern recognition technique and structure as set forth above.

Consider for example use of the present invention in a controlled environment where the unknown individual is looking directly at the camera from a fixed distance (e.g., a police booking station). The size of the array or matrix required to provide the requisite amount of information to identify the unknown individual may be rather small (e.g., two kilobytes long). However, a more difficult operational environment is one where the unknown individual may not be looking at a known direction when the picture is taken (i.e., a customs check point). In this situation, a number of different of cameras (e.g., five) may be required to get one picture of the unknown individual which is suitable for comparison against the known patterns. Each of these pictures would have to be compensated for scaling range and image place rotation and compared to the known templates as discussed . Since this requires processing all five photographs of the unknown individual (i.e., five pictures—five comparisons), the number of individuals who can be identified in a given time period drops by a factor of five, in comparison with the controlled environment where only a single picture of the unknown individual is required.

An even more demanding environment is one where the present invention is used to identify individuals in a surveillance situation (e.g. airport terminals). It is contemplated that even more pictures will be required (e.g., nine photos taken at various aspect angles).

In general, the present invention can reliably identify an individual from a single photograph taken where half or more of the individual's face is visible, including the eyes.

Since the present invention incorporates "faces in the crowd" identification capability as set forth above, it is contemplated that post-processing logic may be added to clearly indicate the individual in the pattern who was matched to the known pattern. This may be performed by simply displaying the unknown image and placing a cursor over the individual in the picture along with his name and any other relevant information.

It is further contemplated that the processing of the present invention may utilize a three-dimensional camera. Such a camera may use electromagnetic energy or x-rays to provide a three dimensional digitized topographic map of a person's face. An advantage of using this type of camera is that the resultant image does not depend on ambient lighting conditions.

As set forth above, the present invention may also be used as a pattern recognizer for virtually any type of pattern, including speech. However, in speech recognition it is contemplated that the gradient processing step may not be required.

In addition, although the present invention has been discussed in the context of a PC based system employing a custom expansion card, one of ordinary skill will clearly understand that the present invention can be implemented in a number of different system architectures. For example, rather than a PC based embodiment the system may be implemented in a custom designed system. An advantage of the PC based system architecture and the use of an expansion card is the availability of PCs. In addition, the components may be embodied in a chip set of integrated circuits, or possibly even a single integrated circuit.

The present invention combines digital and analog processing to achieve more power density than a pure digital computer system, and it provides greater flexibility than an optical pattern recognition system.

Although the present invention has been shown and described with respect to several preferred embodiments thereof, it should be understood by those skilled in the art that various other changes, omissions and additions to the form and detail thereof, may be made therein without departing from the spirit and scope of the invention.

What is claimed is:

1. A pattern recognition system which compares an unknown pattern with a known pattern, the system comprising:

A. a first processing means for transforming said unknown pattern to the frequency domain, thereby providing a processed unknown pattern;

B. a second processing means for transforming said known pattern to the frequency domain, thereby providing a processed known pattern;

C. a multiplying means for multiplying a chirp signal $f_{ch}$, the processed pattern produced by one of said processing means, and the complex conjugate of the processed pattern produced by the other of said processing means, thereby providing a product signal;

D. a dispersive delay line; and

E. a means for applying said product signal to said dispersive delay line, thereby providing a correlation signal indicative of the level of correlation between said unknown pattern and said known pattern.

2. The pattern recognition system of claim 1 wherein said dispersive delay line is a reflective array compressor.

3. The pattern recognition system of claim 1 wherein each of said means for transforming comprises means for performing a Fourier transform.

4. The pattern recognition system of claim 1 further comprising:

17

A. a peak detector which receives said correlation signal and detects the peak of said correlation signal over a certain time period, and provides a peak detected signal indicative thereof; and B. an analog-to-digital converter which receives and digitizes said peak detected signal, and provides a digitized peak detected signal indicative thereof.

5. The pattern recognition system of claim 1 wherein said dispersive delay line comprises a single input transducer which receives said modulated signal and a single output transducer which provides said correlation signal.

6. The pattern recognition system of claim 1 wherein said correlation signal also provides an indication of the spatial region in said unknown pattern which correlated with said known pattern.

7. The pattern recognition system of claim 1 further comprising means for generating said known pattern which comprises an analog-to-digital converter which digitizes a pattern signal of bit-mapped data thereby providing a known pattern.

8. The pattern recognition system of claim 1 further comprising means for dividing said unknown pattern into a plurality of unknown sub-patterns and sequentially applying each of said plurality of unknown sub-patterns to said first processing means, said first processing means providing a plurality of processed unknown sub-patterns, said system further providing a plurality of correlation signals each of which is uniquely associated with the level of correlation between said known pattern and one of said unknown sub-patterns.

9. The pattern recognition system of claim 8 wherein each of a plurality of resulting processed unknown sub-patterns is a sub-array of equal size, and wherein the resulting product signal is continuously fed into said dispersive delay line.

10. The pattern recognition system of claim 1 further comprising means for sequentially applying a plurality of known patterns to said second processing means, thereby providing a plurality of processed known patterns each of which is uniquely associated with one of said known patterns.

11. The pattern recognition system of claim 10 wherein said unknown pattern is indicative of an unknown individual and each of said plurality of known patterns is indicative of a known individual.

12. The pattern recognition system of claim 1 further comprises:

A. means for calculating the gradient of an unknown input pattern thereby providing said unknown pattern which is the gradient of said unknown input pattern; and B. means for calculating the corresponding gradient of a known input pattern thereby providing said known pattern which is the gradient of said known input pattern.

13. The pattern recognition system of claim 12 wherein:

A. said first processing means further comprises:
 i. means for calculating a first two-dimensional gradient of said unknown pattern;
 ii. means for transforming said first two-dimensional gradient to a one-dimensional array; and
 iii. means for calculating a one-dimensional transform of said one-dimensional array thereby providing said processed unknown pattern; and B. said second processing means further comprises:
 i. means for calculating a second two-dimensional gradient of said known pattern;
 ii. means for transforming said second two-dimensional gradient to a one-dimensional array; and
 iii. means for calculating a one-dimensional transform of said one-dimensional array thereby providing said processed known pattern.

14. The pattern recognition system of claim 12 wherein:

A. said first processing means further comprises:
 i. means for calculating a first two-dimensional gradient of said unknown pattern; and
 ii. means for calculating a two-dimensional transform of said first two-dimensional gradient thereby providing said processed unknown pattern; and B. said second processing means further comprises:
 i. means for calculating a second two-dimensional gradient of said known pattern; and
 ii. means for calculating a two-dimensional transform of said second two-dimensional gradient thereby providing said processed known pattern.

15. The pattern recognition system of claim 14 wherein said dispersive delay line includes a plurality of input transducers and a plurality of output transducers.

16. The pattern recognition system of claim 14, wherein said dispersive delay line is a two-dimensional reflective array compressor comprising a plurality of input transducers and a plurality of output transducers.

17. The pattern recognition system of claim 16 wherein said plurality of input transducers launch a surface acoustic wave to a first stack of reflectors which compresses and reduces the surface waves to a second stack of reflectors which compress and redirect the surface waves to said plurality of output transducers.

18. The pattern recognition system of claim 17, wherein said input transducers form a curved array, and said output transducers form a curved array.

19. The pattern recognition system of claim 16 wherein said plurality of input transducers launch a surface acoustic wave to a beam splitter which redirects said surface acoustic waves to a stack of reflectors which compresses and redirects said surface acoustic waves to said plurality of output arrays.

20. The pattern recognition system of claim 19 wherein said plurality of input transducers form a curved array and said plurality of output transducers form a curved array, and said reflective array compressor further comprises a collimator in front of said plurality of input transducers.

21. The pattern recognition system of claim 16 wherein said plurality of input transducers launch a surface acoustic wave to a beam splitter which redirects said surface acoustic wave to a stack of reflectors which compress and redirect said acoustic waves to an output reflector which redirects said reflected acoustic waves to said plurality of output transducers.

22. The pattern recognition system of claim 21 wherein said reflective array compressor further comprises a strip of absorbing material located between said plurality of input transducers and said plurality of output transducers to reduce undesirable coupling.

23. The pattern recognition system of claim 1:

A. wherein said first processing means further comprises means for removing negative frequency values from said processed unknown pattern; and B. wherein said second processing means further comprises means for removing negative frequency values from said processed known pattern.

24. The pattern recognition system of claim 1 wherein said multiplying means further comprises means for hard-limiting said known pattern.

25. The pattern recognition system of claim 1 wherein said means for applying said product signal includes:

a digital-to-analog converter responsive to said product signal which provides an analog signal indicative of said product signal; and a modulator which multiplies said analog signal with a modulation signal $f_m$, equal to the center frequency of said dispersive delay line, thereby providing an analog product signal to said dispersive delay line.

26. The pattern recognition system of claim 25 wherein said dispersive delay line is tuned to said chirp signal $f_{ch}$.

27. The pattern recognition system of claim 26 wherein said means for transforming forming further comprises a discrete Fourier transform.

28. The multiplying means of claim 1 further comprising:

a first electronic memory device for storing said processed unknown pattern;

a means for multiplying said chirp signal $f_{ch}$ by the complex conjugate of said processed known pattern, thereby providing a template;

a second electronic memory device for storing said template; and a complex multiplier which multiplies output data from said first and second electronic memory devices thereby providing said product signal.

29. The pattern recognition system of claim 28, wherein said first and second electronic memory devices both comprise static random access memory (SRAM) devices.

30. The pattern recognition system of claim 28 further comprising a central processing unit which writes said processed unknown pattern to said first electronic memory and writes said template to said second electronic memory.

31. In a pattern recognition system which compares an unknown pattern with a known pattern, a method comprising the steps of:

A. transforming said unknown pattern to the frequency domain to provide a transformed unknown pattern;

B. transforming said known pattern to the frequency domain to provide a transformed known pattern;

C. conjugating said transformed known pattern to provide a conjugated transformed known pattern;

D. multiplying a chirp signal $f_{ch}$ by said conjugated transformed known pattern to provide a chirped conjugated transformed known pattern which is a template;

E. complex multiplying said template by said transformed unknown pattern to provide a product signal; and F. applying said product signal to a dispersive delay line which provides a correlation signal whose value is indicative of the level of correlation between said known pattern and said unknown pattern.

32. The method of claim 31 further comprising the steps of:

sub-dividing said unknown pattern into a plurality of unknown sub-patterns; and performing steps A, E, and F on each of said unknown sub-patterns.

33. The method of claim 32, further comprising the steps of:

A. calculating a mean correlation signal value and a standard deviation value, sigma, for a resulting plurality of correlation signal values;

B. summing said correlation signal values between two and four sigma to create a sum value;

C. calculating the square of said sum value and providing a squared signal value indicative thereof;

D. dividing said squared signal value by the number of correlation signal values located between two and four sigma, and providing an estimated noise signal value indicative thereof;

E. calculating, for each of said correlation signal values, a uniquely associated signal-to-noise ratio signal value by dividing said correlation signal value by said estimated noise signal value; and F. processing, for each sub-pattern, said signal-to-noise signal value and said correlation signal value to determine the level of correlation between said known and unknown patterns.

34. The method of claim 31 further comprising the steps of:

providing a plurality of known patterns; and performing steps B through F on each of said known patterns.

35. The method of claim 31 further comprising the steps of:

A. calculating a first gradient of an unknown input pattern to provide said unknown pattern; and B. calculating a second gradient of a known input pattern to provide said known pattern.

36. The method of claim 35 wherein:

A. the step of calculating a first gradient calculates a one-dimensional gradient; and B. the step of calculating a second gradient calculates a one-dimensional gradient.

37. The method of claim 35 wherein:

A. the step of calculating a first gradient calculates a two-dimensional gradient; and B. the step of calculating a second gradient calculates a two-dimensional gradient.

38. The method of claim 31 further comprising the step of removing negative frequency values from said known and unknown patterns after transforming said known and unknown patterns.

39. The method of claim 31 further comprising the step of hard limiting said template.

40. The method of claim 31 wherein the step of complex multiplying further comprises the steps of:

digitally complex multiplying said template by said transformed unknown pattern to provide a digital product signal;

converting said digital product signal to an analog product signal; and modulating said analog product signal with a modulation signal $f_m$, equal to the center frequency of said dispersive delay line, to provide said product signal.

41. The method of claim 31 wherein each of said steps of transforming comprises performing a Fourier transform.

42. The method of claim 31 wherein each of said steps of transforming comprises performing a discrete Fourier transform.

43. The method of claim 31 further comprising the steps of:

A. peak detecting said correlation signal to provide a peak detected signal; and B. converting said peak detected signal to a digitized peak detected signal.

* * * * *